(12) United States Patent
Tatsuta et al.

(10) Patent No.: US 8,477,179 B2
(45) Date of Patent: Jul. 2, 2013

(54) METHOD OF TRANSMITTING VIDEO DATA FOR WIRELESSLY TRANSMITTING THREE-DIMENSIONAL VIDEO DATA

(75) Inventors: Akihiro Tatsuta, Kyoto (JP); Makoto Funabiki, Osaka (JP); Hiroshi Ohue, Osaka (JP); Hiroshi Mitani, Osaka (JP); Toshiroh Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 12/648,511

(22) Filed: Dec. 29, 2009

(65) Prior Publication Data

US 2010/0289871 A1   Nov. 18, 2010

Related U.S. Application Data

(60) Provisional application No. 61/178,208, filed on May 14, 2009.

(30) Foreign Application Priority Data

May 22, 2009   (JP) ................................ 2009-124351

(51) Int. Cl.
*H04N 13/00* (2006.01)
(52) U.S. Cl.
USPC ......................................................... 348/42
(58) Field of Classification Search
USPC ..................................... 348/42, 473; 345/204
See application file for complete search history.

(56) References Cited

U.S. PATENT DOCUMENTS

| 2002/0030675 A1* | 3/2002 | Kawai ........................... 345/204 |
| 2007/0296859 A1* | 12/2007 | Suzuki ........................ 348/473 |
| 2008/0129879 A1 | 6/2008 | Shao et al. |
| 2008/0320539 A1 | 12/2008 | Ohkita |

FOREIGN PATENT DOCUMENTS

| EP | 2 096 796 | 9/2009 |
| JP | 2002-95018 | 3/2002 |
| JP | 2007-336518 | 12/2007 |
| JP | 2008-252929 | 10/2008 |
| JP | 2009-4877 | 1/2009 |

OTHER PUBLICATIONS

International Preliminary Report on Patentability issued Dec. 22, 2011 in International (PCT) Application No. PCT/JP2009/007156.
WirelessHD Specification Version 1.0 Overview, Oct. 9, 2007, pp. 1-77.
International Search Report issued Mar. 30, 2010 in International (PCT) Application No. PCT/JP2009/007156.

* cited by examiner

*Primary Examiner* — Sath V Perungavoor
*Assistant Examiner* — James Pontius
(74) *Attorney, Agent, or Firm* — Wenderoth, Lind & Ponack, L.L.P.

(57) ABSTRACT

A source device transmits an output format notify message for video data to a sink device before transmitting the video data to the sink device, the output format notify message including a 3D field storing data for identifying whether the video data to be transmitted is two-dimensional video data or three-dimensional video data transmitted using frame packing. In response to this, the sink device identifies a type and a format structure of the video data, and decodes the received video data based on the identified type and format structure of the video data.

6 Claims, 18 Drawing Sheets

Fig.2

| VIDEO FORMAT IDENTIFICATION CODE (VIC) | FORMAT (OUTPUT SPECIFICATIONS) | FIELD RATE |
|---|---|---|
| 1 | 640x480p | 59.94 Hz/60 Hz |
| 2 | 720x480p | 59.94 Hz/60 Hz |
| 3 | 1280x720p | 59.94 Hz/60 Hz |
| 4 | 1920x1080i | 59.94 Hz/60 Hz |
| 5 | 720(1440)x480i | 59.94 Hz/60 Hz |
| 6 | 720(1440)x240p | 59.94 Hz/60 Hz |
| 7 | 2880x480i | 59.94 Hz/60 Hz |
| 8 | 2880x240p | 59.94 Hz/60 Hz |
| 9 | 1440x480p | 59.94 Hz/60 Hz |
| 10 | 1920x1080p | 59.94 Hz/60 Hz |
| 11 | 720x576p | 50 Hz |
| 12 | 1280x720p | 50 Hz |
| 13 | 1920x1080i | 50 Hz |
| 14 | 720(1440)x576i | 50 Hz |
| 15 | 720(1440)x288p | 50 Hz |
| 16 | 2880x576i | 50 Hz |
| 17 | 2880x288p | 50 Hz |
| 18 | 1440x576p | 50 Hz |
| 19 | 1920x1080p | 50 Hz |
| 20 | 1920x1080p | 23.97 Hz/24 Hz |
| 21 | 1920x1080p | 25 Hz |
| 22 | 1920x1080p | 29.97 Hz/30 Hz |
| 23 | 2880x480p | 59.94 Hz/60 Hz |
| 24 | 2880x576p | 50 Hz |
| 25 | 1920x1080i (1250total) | 50 Hz |
| 26 | 1920x1080i | 100 Hz |
| 27 | 1280x720p | 100 Hz |

Fig.3

| VIDEO FORMAT IDENTIFICATION CODE (VIC) | FORMAT (OUTPUT SPECIFICATIONS) | FIELD RATE |
|---|---|---|
| 28 | 720x576p | 100 Hz |
| 29 | 720(1440)x576i | 100 Hz |
| 30 | 1920x1080i | 119.88/120 Hz |
| 31 | 1280x720p | 119.88/120 Hz |
| 32 | 720x480p | 119.88/120 Hz |
| 33 | 720(1440)x480i | 119.88/120 Hz |
| 34 | 720X576p | 200 Hz |
| 35 | 720(1440)x576i | 200 Hz |
| 36 | 720x480p | 239.76/240 Hz |
| 37 | 720(1440)x480i | 239.76/240 Hz |
| 38-127 | RESERVED | |
| 128 | 1024x768 | 60 Hz |
| 129 | 1280x768 | 60 Hz |
| 130 | 1280x800 | 60 Hz |
| 131 | 1440x900 | 60 Hz |
| 132 | 1280x1024 | 60 Hz |
| 133 | 1440x1050 | 60 Hz |
| 134 | 1680x1050 | 60 Hz |
| 135 | 1600x1200 | 60 Hz |
| 136 | 1920x1200 | 60 Hz |
| 137-255 | RESERVED | |

Fig.8

| 3D STRUCTURE CODE | VIDEO DATA TYPE | FORMAT STRUCTURE OF 3D VIDEO DATA |
|---|---|---|
| 0000 | 2D VIDEO DATA | — |
| 0001 | 3D VIDEO DATA | FRAME PACKING (FRAME SEQUENTIAL) |
| 0010 | 3D VIDEO DATA | FIELD ALTERNATIVE |
| 0011 | 3D VIDEO DATA | LINE ALTERNATIVE |
| 0100 | 3D VIDEO DATA | SIDE-BY-SIDE (FULL) |
| 0101 | 3D VIDEO DATA | SIDE-BY-SIDE (HALF) |
| 0110 | 3D VIDEO DATA | L+Depth |
| 0111 | 3D VIDEO DATA | L+Depth+Graphics +(Graphics-Depth) |
| 1000~1111 | RESERVED FIELD | |

Fig. 11

| VIDEO FORMAT IDENTIFICATION CODE (VIC) | FORMAT (INCLUDING FORMAT STRUCTURE IN CASE OF 3D VIDEO DATA) | FIELD RATE |
|---|---|---|
| 1 | 640x480p | 59.94 Hz/60 Hz |
| 2 | 720x480p | 59.94 Hz/60 Hz |
| 3 | 1280x720p | 59.94 Hz/60 Hz |
| 4 | 1920x1080i | 59.94 Hz/60 Hz |
| 5 | 720(1440)x480i | 59.94 Hz/60 Hz |
| 6 | 720(1440)x240p | 59.94 Hz/60 Hz |
| 7 | 2880x480i | 59.94 Hz/60 Hz |
| 8 | 2880x240p | 59.94 Hz/60 Hz |
| 9 | 1440x480p | 59.94 Hz/60 Hz |
| 10 | 1920x1080p | 59.94 Hz/60 Hz |
| 11 | 720x576p | 50 Hz |
| 12 | 1280x720p | 50 Hz |
| 13 | 1920x1080i | 50 Hz |
| 14 | 720(1440)x576i | 50 Hz |
| 15 | 720(1440)x288p | 50 Hz |
| 16 | 2880x576i | 50 Hz |
| 17 | 2880x288p | 50 Hz |
| 18 | 1440x576p | 50 Hz |
| 19 | 1920x1080p | 50 Hz |
| 20 | 1920x1080p | 23.97 Hz/24 Hz |
| 21 | 1920x1080p | 25 Hz |
| 22 | 1920x1080p | 29.97 Hz/30 Hz |
| 23 | 2880x480p | 59.94 Hz/60 Hz |
| 24 | 2880x576p | 50 Hz |
| 25 | 1920x1080i (1250total) | 50 Hz |
| 26 | 1920x1080i | 100 Hz |
| 27 | 1280x720p | 100 Hz |

Fig.12

| VIDEO FORMAT IDENTIFICATION CODE (VIC) | FORMAT (INCLUDING FORMAT STRUCTURE IN CASE OF 3D VIDEO DATA) | FIELD RATE |
|---|---|---|
| 28 | 720x576p | 100 Hz |
| 29 | 720(1440)x576i | 100 Hz |
| 30 | 1920x1080i | 119.88/120 Hz |
| 31 | 1280x720p | 119.88/120 Hz |
| 32 | 720x480p | 119.88/120 Hz |
| 33 | 720(1440)x480i | 119.88/120 Hz |
| 34 | 720X576p | 200 Hz |
| 35 | 720(1440)x576i | 200 Hz |
| 36 | 720x480p | 239.76/240 Hz |
| 37 | 720(1440)x480i | 239.76/240 Hz |
| 38 | 1920x1080p (3D) | 23.97 Hz |
| 39 | 1280x720p (3D) | 59.94 Hz |
| 40 | 1280x720p (3D) | 50 Hz |
| 41-127 | RESERVED | |
| 128 | 1024x768 | 60Hz |
| 129 | 1280x768 | 60Hz |
| 130 | 1280x800 | 60Hz |
| 131 | 1440x900 | 60Hz |
| 132 | 1280x1024 | 60Hz |
| 133 | 1440x1050 | 60Hz |
| 134 | 1680x1050 | 60Hz |
| 135 | 1600x1200 | 60Hz |
| 136 | 1920x1200 | 60 Hz |
| 137-255 | RESERVED | |

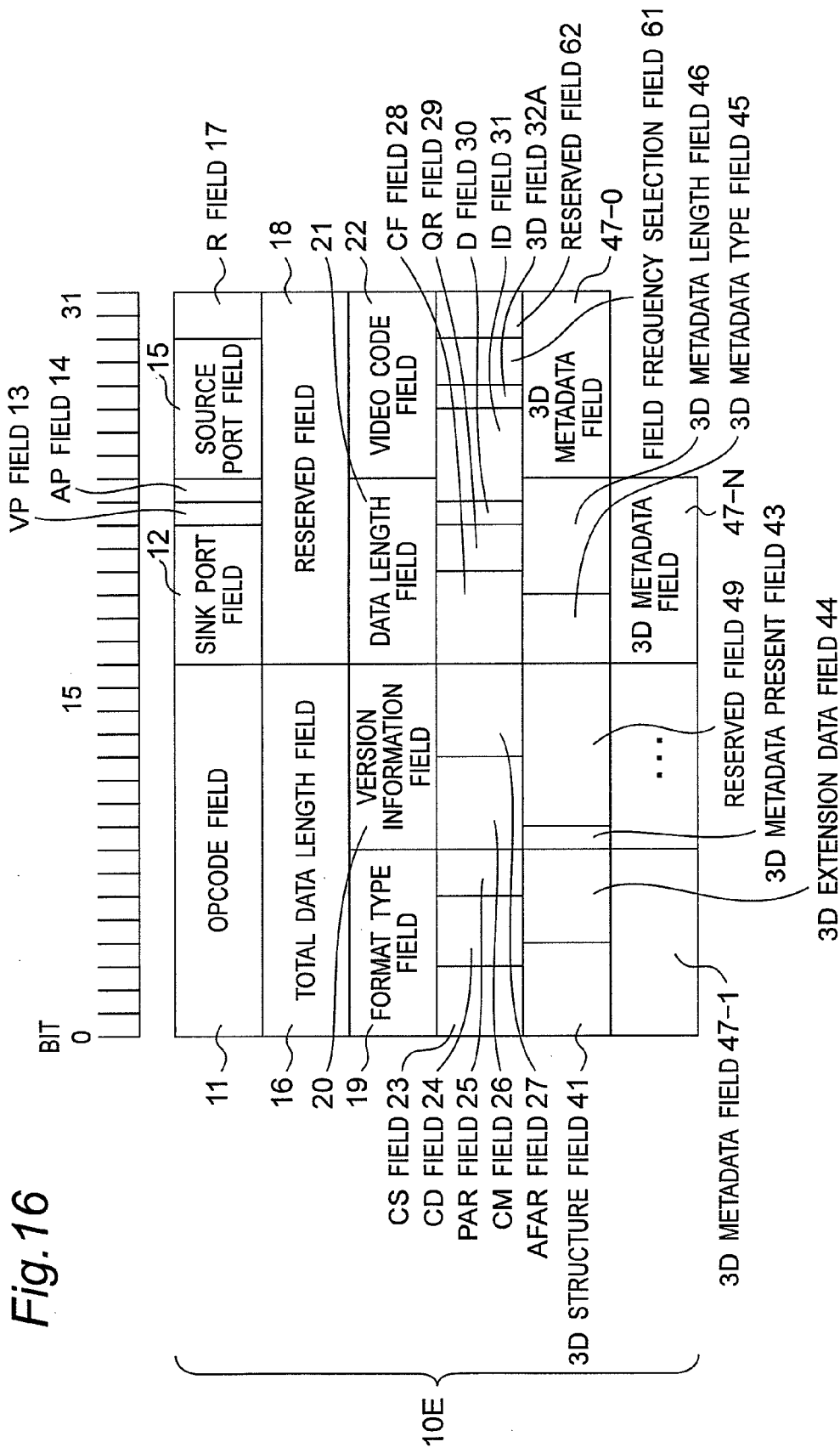

Fig.17

| VIDEO FORMAT IDENTIFICATION CODE (VIC) | FORMAT (OUTPUT SPECIFICATIONS) | FIELD RATE (Hz) | REMARKS |
|---|---|---|---|
| 1 | 640x480p | 59.94/60 | 2D |
| 2 | 720x480p | 59.94/60 | 2D |
| 3 | 1280x720p | 59.94/60 | 2D |
| 4 | 1920x1080i | 59.94/60 | 2D |
| 5 | 720(1440)x480i | 59.94/60 | 2D (PIXEL REPLICATION) |
| 6 | 720(1440)x240p | 59.94/60 | 2D (PIXEL REPLICATION) |
| 7 | 2880x480i | 59.94/60 | 2D (PIXEL REPLICATION) |
| 8 | 2880x240p | 59.94/60 | 2D (PIXEL REPLICATION) |
| 9 | 1440x480p | 59.94/60 | 2D (PIXEL REPLICATION) |
| 10 | 1920x1080p | 59.94/60 | 2D |
| 11 | 720x576p | 50 | 2D |
| 12 | 1280x720p | 50 | 2D |
| 13 | 1920x1080i | 50 | 2D |
| 14 | 720(1440)x576i | 50 | 2D (PIXEL REPLICATION) |
| 15 | 720(1440)x288p | 50 | 2D (PIXEL REPLICATION) |
| 16 | 2880x576i | 50 | 2D (PIXEL REPLICATION) |
| 17 | 2880x288p | 50 | 2D (PIXEL REPLICATION) |
| 18 | 1440x576p | 50 | 2D (PIXEL REPLICATION) |
| 19 | 1920x1080p | 50 | 2D |
| 20 | 1920x1080p | 23.97/24 | 2D |
| 21 | 1920x1080p | 25 | 2D |
| 22 | 1920x1080p | 29.97/30 | 2D |
| 23 | 2880x480p | 59.94/60 | 2D (PIXEL REPLICATION) |
| 24 | 2880x576p | 50 | 2D (PIXEL REPLICATION) |
| 25 | 1920x1080i(1250total) | 50 | 2D |
| 26 | 1920x1080i | 100 | 2D |
| 27 | 1280x720p | 100 | 2D |
| 28 | 720x576p | 100 | 2D |

Fig. 18

| VIDEO FORMAT IDENTIFICATION CODE (VIC) | FORMAT (OUTPUT SPECIFICATIONS) | FIELD RATE (Hz) | REMARKS |
|---|---|---|---|
| 29 | 720(1440)x576i | 100 | 2D (PIXEL REPLICATION) |
| 30 | 1920x1080i | 119.88/120 | 2D |
| 31 | 1280x720p | 119.88/120 | 2D |
| 32 | 720x480p | 119.88/120 | 2D |
| 33 | 720(1440)x480i | 119.88/120 | 2D (PIXEL REPLICATION) |
| 34 | 720X576p | 200 | 2D |
| 35 | 720(1440)x576i | 200 | 2D (PIXEL REPLICATION) |
| 36 | 720x480p | 239.76/240 | 2D |
| 37 | 720(1440)x480i | 239.76/240 | 2D (PIXEL REPLICATION) |
| 38 | 1920x1080p | 47.94/48 | 2D |
| 39 | 2560x1440p | 23.97/24 | 2D (QUAD HD) |
| 40 | 2560x1440p | 25 | 2D (QUAD HD) |
| 41 | 2560x1440p | 29.97/30 | 2D (QUAD HD) |
| 42 | 2560x1440p | 50 | 2D (QUAD HD) |
| 43 | 2560x1440p | 59.94/60 | 2D (QUAD HD) |
| 44 | 3840x2160p | 23.97/24 | 2D (QUAD HD) |
| 45 | 3840x2160p | 25 | 2D (QUAD HD) |
| 46 | 3840x2160p | 29.97/30 | 2D (QUAD HD) |
| 47 | 4096x2160p | 23.97/24 | 2D (DIGITAL MOVIE) |
| 48 | 4096x2160p | 25 | 2D (DIGITAL MOVIE) |
| 49 | 1920x1080p | 100 | 2D |
| 50 | 1920x1080p | 119.88/120 | 2D |
| 51-95 | RESERVED | | |
| 96 | 1920x1080p | 23.97/24 | 3D (FRAME SEQUENTIAL) |
| 97 | 1920x1080p | 25 | 3D (FRAME SEQUENTIAL) |
| 98 | 1280x720p | 59.94/60 | 3D (FRAME SEQUENTIAL) |
| 99 | 1280x720p | 50 | 3D (FRAME SEQUENTIAL) |
| 100-127 | RESERVED | | |

METHOD OF TRANSMITTING VIDEO DATA FOR WIRELESSLY TRANSMITTING THREE-DIMENSIONAL VIDEO DATA

This application claims the benefit of U.S. Provisional Application No. 61/178,208 filed May 14, 2009.

TECHNICAL FIELD

The present invention relates to a method of transmitting video data, a source device for transmitting the video data, a sink device for receiving the video data, and a wireless communication system including the source device and the sink device. In particular, the present invention relates to a method of transmitting three-dimensional (also referred to as 3D or stereoscopic hereinafter) video data including first and second video frame data such as right-eye video frame data and left-eye video frame data, a source device for transmitting the video data, the sink device for receiving the video data, and a communication system including the source device and the sink device.

BACKGROUND ART

A WirelessHD standard has been drawn up for wirelessly transmitting uncompressed baseband video signals and uncompressed digital audio signals among audio and visual devices (referred to as AV (Audio and Visual) devices hereinafter). The WirelessHD is a technical specification for viewing high-definition moving image data stored in a source device such as a digital video recorder, a set-top box or a personal computer on a sink device such as a high-definition television without connecting the source device to the sink device via a cable. In addition, since control signals are transmitted bi-directionally, it is possible to control a television set and a digital video recorder so as to cooperate with each other, or it is possible to construct a home theater by a plurality of AV devices and control the same AV devices integrally. In addition, protocols for these controls are defined. Further, since it is possible to transmit high-quality contents by the WirelessHD, DTCP (Digital Transmission Content Protection) is defined as a content protection method so that provided contents are not illegally reproduced or illegally replicated.

For example, wireless transmission methods compliant with the WirelessHD according to prior art are described in Patent Documents 1 and 2, and a Non-patent Document 1. In addition, methods of wirelessly transmitting AV data according to prior art are described in Patent Documents 3 and 4.

CITATION LIST

Patent Documents

[Patent Document 1] Japanese patent laid-open publication No. JP-2008-252929-A.
[Patent Document 2] Japanese patent laid-open publication No. JP-2009-4877-A.
[Patent Document 3] United States Patent Application Publication No. 2008/0320539 A1.
[Patent Document 4] United States Patent Application Publication No. 2008/0129879 A1.
[Patent Document 5] United States Patent Application Publication No. 2002/0030675 A1.
[Patent Document 6] Japanese patent laid-open publication No. JP-2002-95018-A.

Non-Patent Documents

[Non-Patent Document 1] WirelessHD Specification Version 1.0 Overview, Oct. 9, 2007.

SUMMARY OF INVENTION

Technical Problem

However, in the WirelessHD according to the prior art, it is assumed that video data is two-dimensional (also referred to as 2D or flat) content data (referred to as two-dimensional data hereinafter) including one frame data. Therefore, when the video data is three-dimensional content data (referred to as three-dimensional data hereinafter) including first and second video frame data such as right-eye video frame data and left-eye video frame data, the source device cannot wirelessly transmit the three-dimensional content data to the sink device such as a 3D television device.

In addition, Patent Documents 5 and 6 disclose methods of transmitting the three-dimensional data. However, the Patent Documents 5 and 6 do not disclose a concrete method of wirelessly transmitting the three-dimensional data using the WirelessHD.

It is an object of the present invention to provide a method of transmitting video data, a source device for transmitting the video data, a sink device for receiving the video data, and a communication system including the source device and the sink device capable of solving the above-mentioned problems, and capable of transmitting the three-dimensional video data including the first and second video frame data such as the right-eye video frame data and left-eye video frame data.

Solution to the Problem

A source device according to a first aspect of the present invention is a source device for a communication system for transmitting video data from the source device to a sink device. The source device includes first controller means for transmitting an output format notify message to the sink device before transmitting video data to the sink device. The output format notify message includes data representing whether a type of the video data to be transmitted is (a) three-dimensional video data including first video frame data and second video frame data or (b) two-dimensional data including third video frame data, and includes format information on the three-dimensional video data when the video data to be transmitted is the three-dimensional video data.

The above-mentioned source device includes transmitter means for combining the first video frame data and the second video frame data into combined video frame data for every video frame, and transmitting the combined video frame data to the sink device, when the video data is the three-dimensional video data. The format information includes information on a format structure for identifying parameters for combining the first video frame data and the second video frame data into the combined video frame data.

In addition, in the above-mentioned source device, the output format notify message includes a 3D field storing data representing whether the video data to be transmitted is the two-dimensional video data or three-dimensional video data transmitted using a predetermined format structure.

Further, in the above-mentioned source device, the output format notify message includes a 3D structure field storing a 3D structure code for identifying whether the type of the video data to be transmitted is the two-dimensional video data or the three-dimensional video data, and for identifying which format structure is used from among a predetermined plurality of format structures to transmit the three-dimensional video data when the video data to be transmitted is the three-dimensional video data.

Still further, in the above-mentioned source device, the output format notify message includes a video code field storing a video form at information identifier for identifying the type of the transmitted video data and a format structure of the three-dimensional video data when the type of the video data is the three-dimensional video data.

In addition, in the above-mentioned source device, the output format notify message includes (a) a 3D field storing data for identifying whether the type of the video data to be transmitted is the two-dimensional video data or the three-dimensional video data, (b) a 3D structure field storing a 3D structure code for identifying which format structure is used from among a predetermined plurality of format structures to transmit the three-dimensional video data when the video data to be transmitted is the three-dimensional video data, and (c) a 3D metadata field storing 3D metadata on the three-dimensional video data when the type of the video data to be transmitted is the three-dimensional video data.

Further, in the above-mentioned source device, the format information further includes a field rate of the video data to be transmitted, number of vertical active pixels of the video data to be transmitted, number of horizontal active pixels of the video data to be transmitted, and a vertical synchronizing frequency of the video data to be transmitted.

Still further, in the above-mentioned source device, the output format notify message includes a parameter common to the two-dimensional video data and the three-dimensional video data.

A sink device according to a second aspect of the present invention is a sink device for a communication system for transmitting video data from a source device to the sink device. The sink device includes second controller means for receiving an output format notify message from the source device. The output format notify message includes data representing whether a type of video data to be transmitted is (a) three-dimensional video data including first video frame data and second video frame data or (b) two-dimensional data including third video frame data, and includes format information on the three-dimensional video data when the video data to be transmitted is the three-dimensional video data. The second controller means identifies the type of the video data to be transmitted and the format information on the three-dimensional video data when the type of the video data to be transmitted is the three-dimensional video data based on a received output format notify message. The sink device includes receiver means for receiving the video data from the source device, and decoding the video data based on an identified type and identified format information.

A communication system according to a third aspect of the present invention is a communication system for transmitting video data from a source device to a sink device. The communication system includes the above-mentioned source device and the above-mentioned sink device.

A method of transmitting video data according to a third aspect of the present invention is provided for a communication system for transmitting the video data from a source device to a sink device. The method include the steps of:

at the source device, transmitting an output format notify message to the sink device before transmitting video data to the sink device, the output format notify message including data representing whether a type of the video data to be transmitted is (a) three-dimensional video data including first video frame data and second video frame data or (b) two-dimensional data including third video frame data, and including format information on the three-dimensional video data when the video data to be transmitted is the three-dimensional video data;

at the sink device, receiving the output format notify message from the source device, and identifying the type of the video data to be transmitted and the format information on the three-dimensional video data when the type of the video data to be transmitted is the three-dimensional video data based on a received output format notify message; and at the sink device, receiving the video data from the source device, and decoding the video data based on an identified type and identified format information.

Advantageous Effects of Invention

According to the method of transmitting video data, the source device transmitting the video data, the sink device receiving the video data, and the communication system including the source device and the sink device according to the present invention, the source device transmits the output format notify message to the sink device before transmitting the video data to the sink device, the output format notify message including data representing whether the type of the video data to be transmitted is (a) three-dimensional video data including first video frame data and second video frame data or (b) two-dimensional video data including third video frame data, and including the format information on three-dimensional video data when the video data to be transmitted is the three-dimensional video data. In addition, the sink device receives the output format notify message from the source device, identifies the type of the video data to be transmitted and the format information on the three-dimensional video data when the type of the video data to be transmitted is the three-dimensional video data based on the received output format notify message, receives the video data from the source device, and decodes the video data based on the identified type and format information. Therefore, it is possible to transmit the three-dimensional video data.

BRIEF DESCRIPTION OF DRAWINGS

FIG. 2 is a table showing a first part of each of VIC (Video Format Identification Code) tables 115*t* and 127*t* of FIG. 1;

FIG. 3 is a table showing a second part of each of the VIC tables 115*t* and 127*t* of FIG. 1;

FIG. 8 is a table showing each of 3D structure tables 115*v* and 127*v* of FIG. 7;

FIG. 11 is a table showing a first part of each of VIC tables 115ta and 127ta of FIG. 10;

FIG. 12 is a table showing a second part of each of the VIC tables 115ta and 127ta of FIG. 10;

FIG. 16 is a diagram showing a format of an output format notify message 10E according to a sixth preferred embodiment of the present invention;

FIG. 17 is a table showing a first part of each of VIC tables 115ta and 127ta according to a seventh preferred embodiment of the present invention; and FIG. 18 is a table showing a second part of each of the VIC tables 115ta and 127ta according to the seventh preferred embodiment of the present invention.

DESCRIPTION OF EMBODIMENTS

Figure 1:
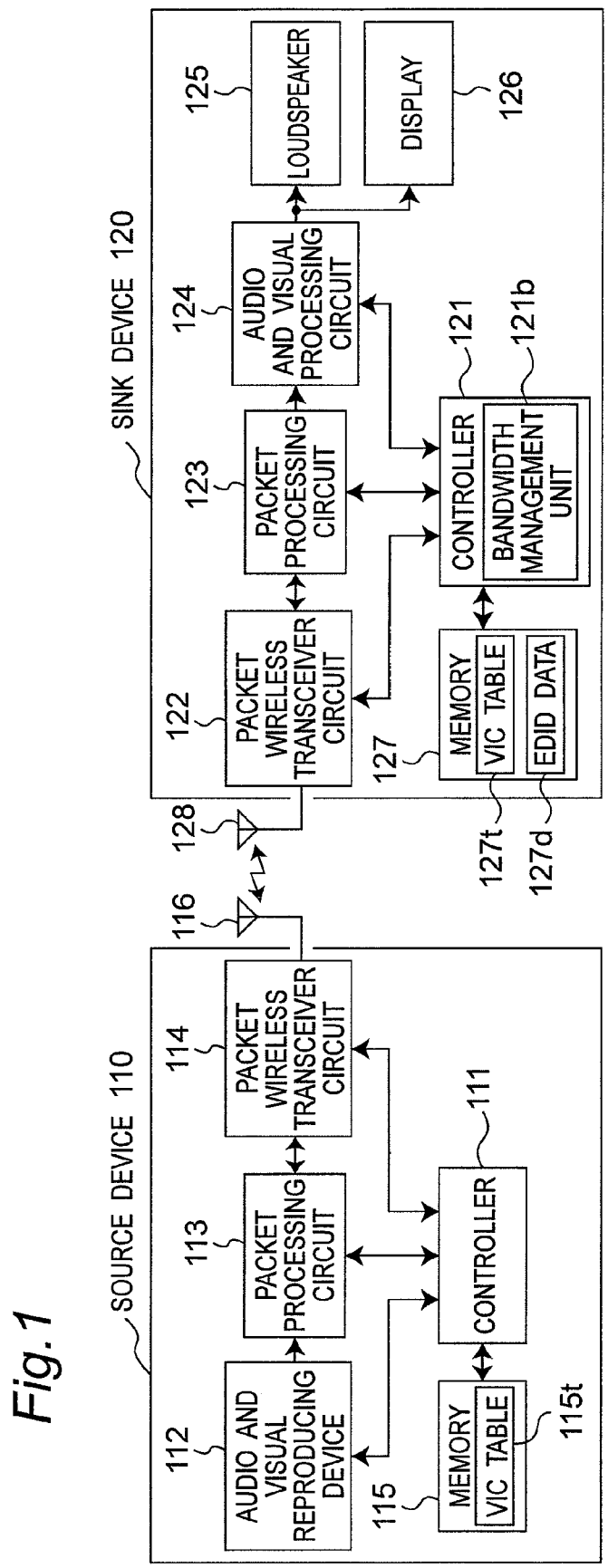
FIG. 1 is a block diagram showing a configuration of a wireless communication system for transmitting video data using a video data packet transmission method according to a first preferred embodiment of the present invention.

Preferred embodiments according to the present invention will be described below with reference to the attached drawings. Components similar to each other are denoted by the same reference numerals and will not be described herein in detail.

First Preferred Embodiment

FIG. 1 is a block diagram showing a configuration of a wireless communication system for transmitting video data using a video data packet transmission method according to a first preferred embodiment of the present invention FIGS. 2 and 3 show each of VIC tables 115t and 127t of FIG. 1.

As described later in detail, a source device 110 according to the present preferred embodiment is characterized by including a controller 111 for transmitting an output format notify message 10 to a sink device 120 before the source device 110 transmits video data to the sink device 120. The output format notify message 10 includes data representing whether a type of the video data to be transmitted is (a) three-dimensional video data including left-eye video frame data 181 and right-eye video frame data 182 or (b) two-dimensional video data including one video frame data, and format information on the three-dimensional video data when the video data to be transmitted is the three-dimensional video data. Further, the source device 110 is characterized by including a packet processing circuit 113 for combining the left-eye video frame data 181 and the right-eye video frame data 182 into combined video frame data 183 for every video frame, and a packet wireless transceiver circuit 114 for transmitting the combined video frame data 183 to the sink device 120. It is to be noted that the packet wireless transceiver circuit 114 and the packet processing circuit 113 constitute a transmitter circuit in the source device 110.

In addition, the sink device is characterized by including a controller 121, a packet wireless transceiver circuit 122 for receiving the video data from the source device 110, and a packet processing circuit 123. The controller 121 receives the output format notify message 10 from the source device 110, and identifies the type of the transmitted video data and the format information on the three-dimensional video data when the type of the transmitted video data is the three-dimensional video data, based on the received output format notify message 10. The packet processing circuit 123 decodes the video data based on the identified type and format information. It is to be noted that the packet wireless transceiver circuit 122 and the packet processing circuit 123 constitute a receiver circuit in the sink device 120.

Referring to FIG. 1, the wireless communication system according to the present preferred embodiment complies with the WirelessHD. The source device 110 which functions as a source device of AV content data is configured to include an audio and visual reproducing device 112, the packet processing circuit 113, the packet wireless transceiver circuit 114 having an antenna 116, a memory 115 for previously storing the VIC table 115t, and the controller 111 for controlling operations of these devices or circuits 112 to 115. The audio and visual reproducing device 112, which is, for example, a DVD player, reproduces video data and audio data from an external storage device or a recording medium such as an MD or a DVD, and outputs the video data and audio data to the packet processing circuit 113. The packet processing circuit 113 converts the inputted video data and audio data into a digital signal in a predetermined packet form for every video frame, and outputs the digital signal to the packet wireless transceiver circuit 114. Further, the packet processing circuit 113 converts a control message (for example, the output format notify message 10 to be described later in detail) from the controller 111 into a digital signal in a predetermined packet form, and outputs the digital signal to the packet wireless transceiver circuit 114. The packet wireless transceiver circuit 114 digitally modulates a carrier signal according to the inputted digital signal, and wirelessly transmits the modulated wireless signal to a packet wireless transceiver circuit 122 of a sink device 120 via the antenna 116. On the other hand, the packet wireless transceiver circuit 114 receives a wireless signal wirelessly transmitted from the sink device 120 via the antenna 116, demodulates the received wireless signal into a baseband signal, and outputs the baseband signal to the packet processing circuit 113. The packet processing circuit 113 extracts only a predetermined control command from the inputted baseband signal by a predetermined packet separation processing, and thereafter, outputs the control command to the controller 111.

In addition, the sink device 120 is configured to include the packet wireless transceiver circuit 122 including an antenna 128, the packet processing circuit 123, an audio and visual processing circuit 124, a loudspeaker 125, a display 126 for displaying the two-dimensional video data and the three-dimensional video data, a memory 127 for previously storing EDID (Extended Display Identification Data) data 127d and the VIC table 127t, and a controller 121 for controlling operations of these circuits or the like 122 to 124 and 127. In addition, the controller 121 is configured to include a bandwidth management unit 121b which manages bandwidths used by a wireless network and timing control for signal transmission. The packet wireless transceiver circuit 122 demodulates the wireless signal received via the antenna 128 into a baseband signal, and thereafter, outputs the baseband signal to the packet processing circuit 123. The packet processing circuit 123 decodes the received packets by extracting only the video data, the audio data, and the predetermined command from an inputted digital signal by a predetermined packet separation processing, outputs the video data and the audio data to the audio and visual processing circuit 124, and outputs the control command to the controller 121. The audio and visual processing circuit 124 executes a predetermined signal processing and a D/A conversion processing on the inputted audio data, and outputs the processed audio data to the loudspeaker 125 so as to output sound. In addition, the audio and visual processing circuit 124 executes a predetermined signal processing and a D/A conversion processing on the inputted video data, and outputs the processed video data to the display 126 so as to display video.

Referring to FIGS. 2 and 3, each of the VIC tables 115t and 127t includes VICs (Video format information identifiers) for identifying a plurality of video formats of the video data. In this case, each video format represents video data output specifications for the sink device 120, and includes information on a number of vertical active pixels, a number of horizontal active pixels, a scanning method (progressive scanning (p) or interlaced scanning (i)), and a vertical synchronizing frequency (also referred to as a field rate hereinafter) of the video data. In the present preferred embodiment, the VICs are allocated to the respective video format of the two-dimensional video data. In addition, the EDID data 127d includes data such as respective VICs of video data, which can be displayed using the display 126, product information and a manufacturer name of the display 126, a video coding method (such as RGB, $YC_BC_R$ 4:4:4 or $YC_BC_R$ 4:2:2), and audio output specification (referred to as audio format hereinafter) such as sound output sampling. The respective VICs in the EDID data 127d are selected from among the VICs included in the VIC table 127t.

Figure 4:
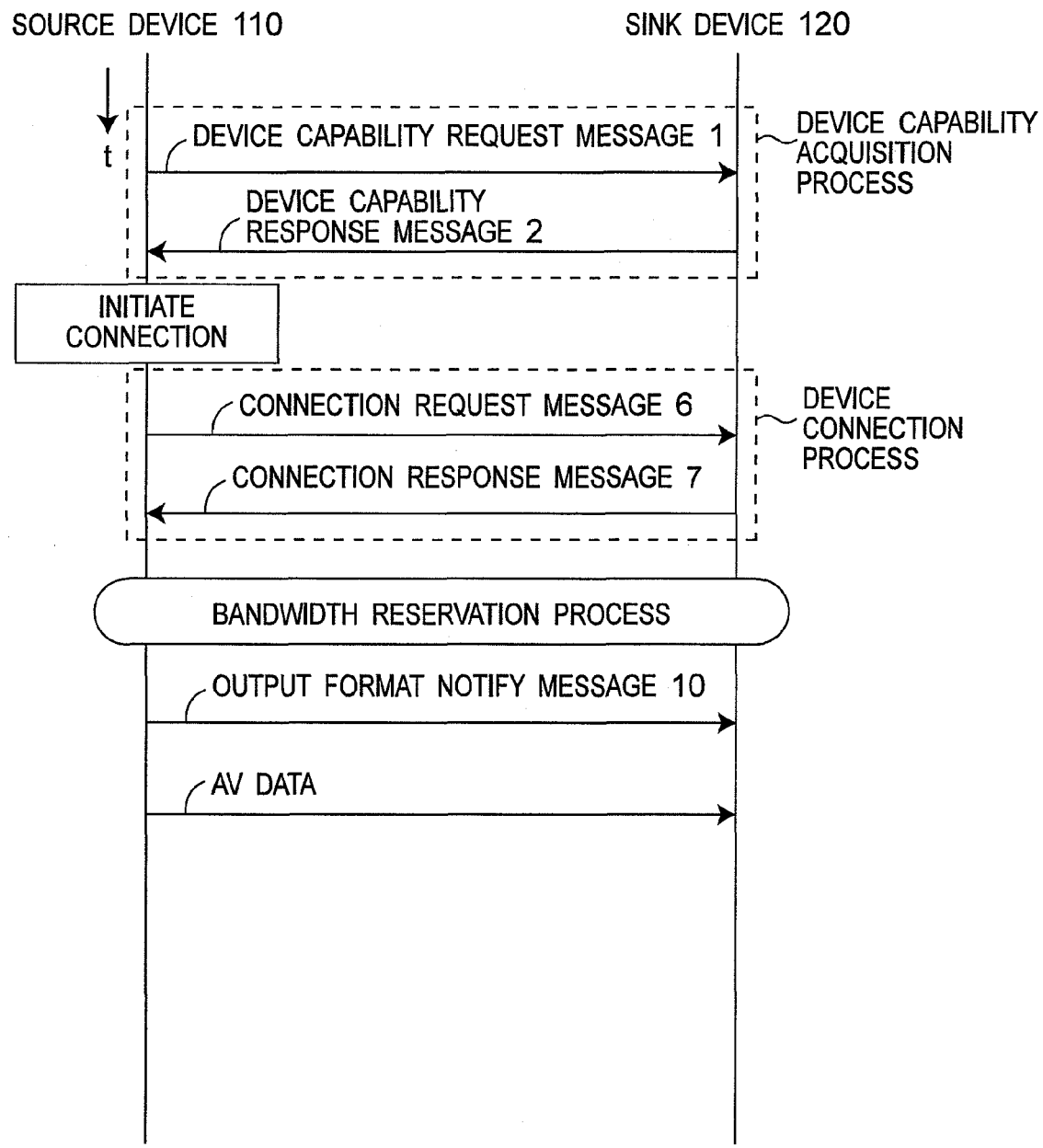
FIG. 4 is a sequence diagram showing operation of the wireless communication system of FIG. 1.

FIG. 4 is a sequence diagram showing operation of the wireless communication system of FIG. 1. First of all, a device capability acquisition process (an input format acquisition process) is executed between the source device 110 and the sink device 120 so that the source device 110 acquires information on video formats and audio formats supported by the sink device 120. In the device capability acquisition process, the source device 110 wirelessly transmits a device capability request (DEVICE_CAPABILITY_REQUEST) message (also referred to as a device information request message) 1 for requesting information on a device capability of the sink device 120, to the sink device 120. In response to this, the sink device 120 wirelessly transmits a device capability response (DEVICE_CAPABILITY_RESPONSE) message (also referred to as a device information response message) 2 to the source device 110.

Next, referring to FIG. 4, a device connection process is performed between the source device 110 and the sink device 120. In the present preferred embodiment, the source device 110 initiates the device connection process, a port reservation process and a bandwidth reservation process. First of all, in the device connection process, the source device 110 wirelessly transmits a connection request (CONNECT_REQUEST) message 6 compliant with the WirelessHD to the sink device 120 to confirm whether to transmit AV data to the sink device 120 or not. In this case, an S bit in the connection request message 6 is set to zero, and a port field in the connection request message 6 contains data representing a source port. When the sink device 120 receives the connection request message 6, the sink device 120 wirelessly transmits a connection response (CONNECT_RESPONSE) message 7, which is compliant with the WirelessHD and includes a result of the connection request from the source device 110, to the source device 110. In this case, if the sink device 110 accepts the connection request from the source device 110, the sink device 110 stores data representing "Success" in a result code field in the connection response message 7, and stores data on a sink port reserved for AV data transmission in a sink port field in the connection response message 7. If an RF bit in the connection request message 6 is set to 1, the sink device 120 stores information on formats supported by the sink device 120 in predetermined fields (a total data length field, a format type field, a data length field, and a format data field) in the connection response message 7. If the RF bit in the connection request message 6 is set to zero, the sink device 120 stores zero in the total data length field of the connection response message 7. If the sink device 120 rejects the connection request from the source device 110, the sink device 120 stores data representing "Failure" with an appropriate reason in the result code field in the connection response message 7.

Referring to FIG. 4, after wirelessly receiving the connection response message 7 which indicates "Success", the source device 110 performs a bandwidth (resource) reservation process (sequence) compliant with the WirelessHD for securing a transmission bandwidth for transmitting AV content data including the video data and the audio data from the source device 110 to the sink device 120. In the bandwidth reservation process, in order to request a bandwidth for transmitting the AV data and to reserve the bandwidth, the source device 110 wirelessly transmits a bandwidth request command to the sink device 120. In response to this, the bandwidth management unit 121b of the sink device 120 allocates a reservation time period required for transmitting the AV content data from the source device 110 to the sink device 120, and wirelessly transmits an time period designation command including information on the allocated reservation time period to the source device 110.

Further, referring to FIG. 4, after the source device 120 normally completes the bandwidth reservation process, the source device 110 transmits the output format notify message (OUTPUT_FORMAT_NOTIFY) message 10 including information on a video format and an audio format of AV data to be transmitted to the sink device 10, before transmitting the AV data to the sink device 120 or when at least one of the video format and the audio format of the AV data is changed. Then, the source device 110 transmits the AV data to the sink device 120. The sink device 120 identifies the video format and the audio format of the AV data to be transmitted based on the output format notify message 10 from the source device 110, and decodes the received AV data based on the identified video format and audio format.

Figure 5:
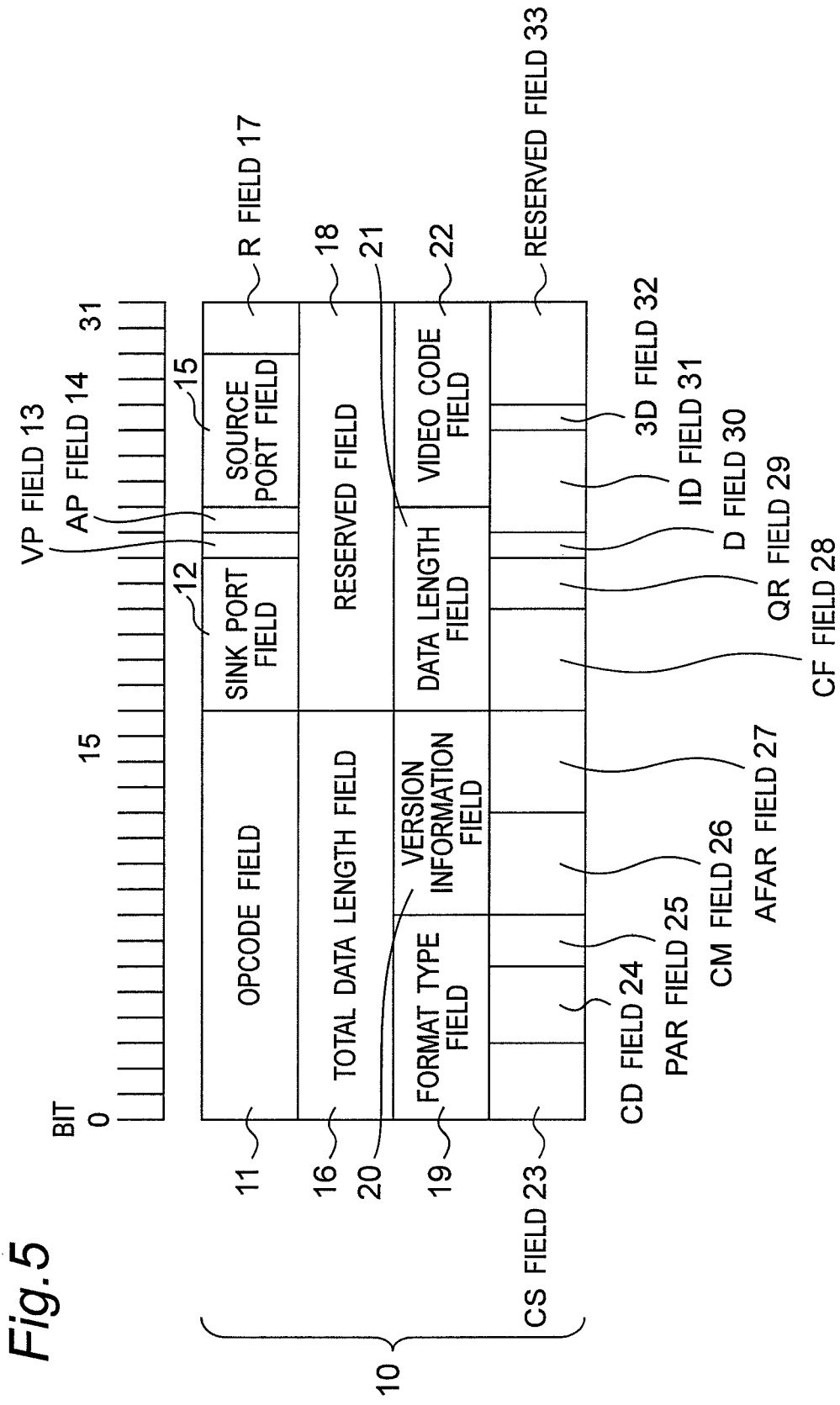
FIG. 5 is a diagram showing a format of a device capability request message 1 of FIG. 4.

FIG. 5 is a diagram showing a format of the output format notify message 10 of FIG. 4. Referring to FIG. 5, the output format notify message 10 includes the following fields:

(1) An opcode (Opcode) field 11 storing an operation code of the output format notify message 10.

(2) A 6-bit sink port (SinkPort) field 12 storing a sink port number reserved for transmission of AV data.

(3) A 1-bit VP field 13 storing 1 when a sink port and a source port are used for video data, and storing 0 when the sink port and the source port are not used for video data.

(4) A 1-bit AP field 14 storing 1 when the sink port and the source port are used for audio data, and storing 0 when the sink port and the source port are not used for audio data.

(5) A 6-bit source port (SrcPort) field 15 storing a source port number reserved for transmission of AV data.

(6) A 16-bit total data length (Total_length) field 16 storing data representing a data length of fields excluding the opcode field 11 and the total data length field 16 from the output format notification message 10.

(7) A 2-bit R (Reserved) field 17 and a 16-bit reserved field 18 reserved for future use.

(8) An 8-bit format type (Format_Type) field 19 storing data representing a type of data stored in format data fields (fields 22 to 33 in FIG. 5) subsequent to the data length field 21. In the present preferred embodiment and each of the following preferred embodiments, the format type field 19 stores data representing video format information (VIDEO_INFO).

(9) An 8-bit version information (Version) field 20 storing a version number of the format data fields.

(10) An 8-bit data length (Length) field 21 storing a data length of the format data fields.

(11) An 8-bit video code field 22 storing a VIC representing a video format of video data to be transmitted.

(12) A 3-bit CS (Color Space) field 23 storing data representing a type of a color format of the video data to be transmitted.

(13) A 3-bit CD (Color Depth) field 24 storing the number of bits of a color depth of the video data to be transmitted.

(14) A 2-bit PAR (Picture Aspect Ratio) field 25 storing data representing an aspect ratio of a picture to be transmitted.

(15) A 4-bit CM (Colorimetry) field 26 storing colorimetry information on the video data to be transmitted.

(16) A 4-bit AFAR (Active Format Aspect Ratio) field 27 storing data representing an aspect ratio of active pixels of the video data to be transmitted.

(17) A 4-bit CF (Content Flag) field 28 storing data representing a type of a content to be supported.

(18) A 2-bit QR (Quantization Range) field 29 storing data representing a quantization bit range of the video data to be transmitted.

(19) A 1-bit D (Detailed Timing Information) field 30 storing 1 when detailed timing information is used as timing information on the video data to be transmitted, and storing 0 when the detailed timing information is not used as the timing information on the video data to be transmitted.

(20) A 4-bit ID (ID of Detailed Timing Information) field 31 storing an ID of the detailed timing information when 1 is stored in the D field 30, and storing 0 when 0 is stored in the D field 30.

(21) A 1-bit 3D field 32 storing data for identifying whether a type of the video data to be transmitted is (a) the two-dimensional video data or (b) the three-dimensional video data transmitted using frame packing (also referred to as frame sequential). Concretely speaking, the 3D field 32 stores 0 when the video data to be transmitted is the two-dimensional video data, and stores 1 when the video data to be transmitted is the three-dimensional video data transmitted using the frame packing.

(22) A 4-bit reserved field 33 reserved for future use.

Next, there will be described operations of the source device 110 and the sink device 120 when the source device 110 transmits three-dimensional video data including the left-eye video frame data 181 and the right-eye video frame data 182, to the sink device 120. First of all, the source device 110 sets 1 to the 3D field 32 in the output format notify message 10, and transmits the output format notify message 10 to the sink device 120. By detecting that 1 is set to the 3D field 32 in the output format notify message 10, the sink device 120 identifies that the source device 110 transmits the three-dimensional video data to the sink device 120, and that the source device 110 transmits the three-dimensional video data using the frame packing.

Next, after transmitting the output format notify message 10 including the 3D field 32 set to 1 to the sink device 120, the controller 111 of the source device 110 controls the packet processing circuit 113 to combine the right-eye video frame data 182 and the left-eye video frame data 181 into the combined video frame data 183, using the frame packing for every video frame.

Figure 6:
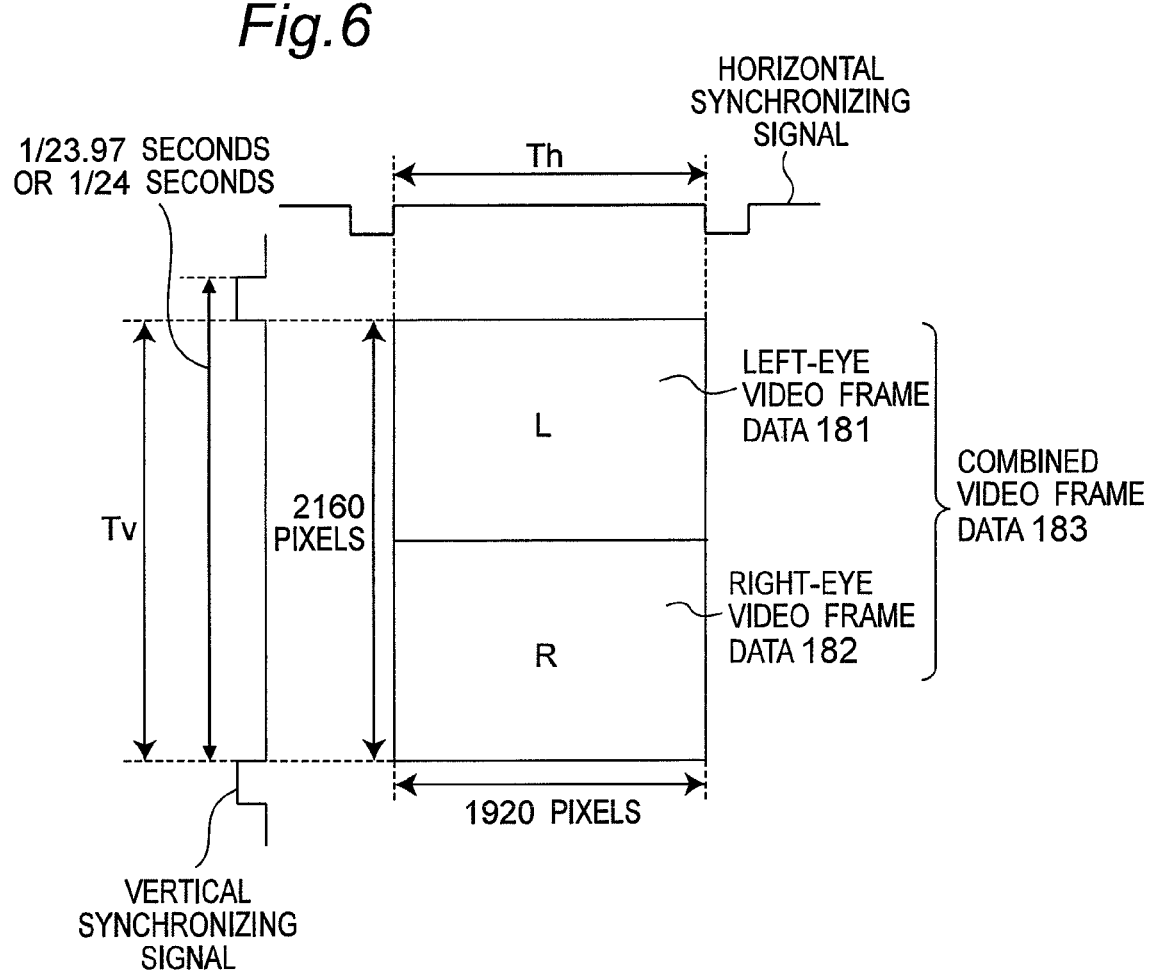
FIG. 6 is a data arrangement diagram of combined video frame data 183 generated by a source device 110 of FIG. 1, the data arrangement diagram being shown based on relation with a horizontal synchronizing signal and a vertical synchronizing signal.

FIG. 6 is a data arrangement diagram of the combined video frame data 183 generated by the source device 110 of FIG. 1, the data arrangement diagram being shown based on relation with a horizontal synchronizing signal and a vertical synchronizing signal. Referring to FIG. 6, a horizontal display interval This a time interval provided between a horizontal synchronizing interval and a next horizontal synchronizing interval of the horizontal synchronizing signal, and a vertical display interval Tv is a time interval provided between a vertical synchronizing interval and a next vertical synchronizing interval of the vertical synchronizing signal. The number of horizontal active pixels and the number of vertical active pixels of each of the left-eye video frame data 181 and the right-eye video frame data 182 are 1920 and 1080, respectively. In addition, the number of horizontal pixels and the number of vertical pixels of the combined video frame data 183 are 1920 and 2160, respectively. Further, the vertical synchronizing frequency of the left-eye video frame data 181 and the right-eye video frame data 192 is 23.97 Hz or 24 Hz. The packet processing circuit 113 combines the left-eye video frame data 181 and the right-eye video frame data 182 into the combined video frame data 183. In this case, the combined video frame data 183 is configured so that, in the horizontal display interval Th, the left-eye video frame data 181 having 1080 lines is transmitted for the first half of the vertical display interval Tv, and thereafter, the right-eye video frame data 182 having 1080 lines is transmitted for the second half of the vertical display interval Tv.

Next, the controller 111 of the source device 110 controls the packet processing circuit 113 to divide the combined video frame data 183 into a plurality of packets according to a predetermined packet format compliant with the WirelessHD. In response to this, the packet processing circuit 113 divides the combined video frame data 183 into a plurality of packets according to the packet format compliant with the WirelessHD. In this case, the packet processing circuit 113 stores horizontal position data in the horizontal display interval Th and vertical position data in the vertical display interval Tv of a first pixel of the combined video frame data 183 stored in each of sub-packets for transmitting the combined video frame data 183, in an H-position and a V-position included in a header of each of the sub-packet, as data for identifying the right-eye video frame data 182 and the left-eye video frame data 181. Then, the controller 111 controls the packet wireless transceiver circuit 114 to wirelessly transmit AV data including the generated plurality of packets to the sink device 120 for allocated reservation time period. The sink device 120 decodes the packets of the video data in the received AV data, based on the data stored in the 3D field 32 included in the received output format notify message 10.

The source device 110 divides audio data into a plurality of audio packets according to an audio packet format compliant with the WirelessHD, and wirelessly transmits the audio packets to the sink device 120 together with the plurality of packets of the combined video frame data 183. In addition, in the source device 110, when the type of the video data is the two-dimensional video data, the packet processing circuit 113 generates two-dimensional video frame data according to a video format of a selected VIC for every video frame, and generates a plurality of packets by dividing the generated video frame data into the plurality of packets according to a packet format compliant with the WirelessHD.

In the WirelessHD according to the prior art, it is assumed that the two-dimensional video data is wirelessly transmitted, and therefore, an output format notify message according to the prior art does not include the 3D field 32 as compared with the output format notify message 10 according to the present preferred embodiment. Therefore, the source device 110 cannot notify the sink device 120 that the video data to be transmitted is the three-dimensional video data, and cannot wirelessly transmit the three-dimensional video data to the sink device 120. According to the present preferred embodiment, the output format notify message 10 includes the 3D field 32, which stores the data for identifying whether the video data to be transmitted is the two-dimensional video data or the three-dimensional video data transmitted using the frame packing. Therefore, the source device 110 can notify the sink device 120 that the video data is the three-dimensional video data, and can notify the sink device 120 of a format structure of the video data using the 3D field 32 in the output format notify message 10, before transmitting 3D content data including the three-dimensional video data to the sink device 120. In addition, the sink device 120 can decode the video data transmitted from the source device 110 based on the data stored in the 3D field 32 in the received output format notify message 10. Therefore, according to the present preferred embodiment, the source device 110 can transmit the three-dimensional video data to the sink device 120 using the format structure notified using the output format notify message 10.

In addition, according to the present preferred embodiment, the source device 110 transmits the output format notify message 10 to the sink device 120 using one packet other than the packets for transmitting the video data before transmitting the video data. Accordingly, before receiving the video data, the sink device 120 can identify the type and the format structure of the video data. As compared with such a case where the video data and the data for identifying the type and format structure of the video data are transmitted using the same packet, the sink device 120 can smoothly reproduce the video data. Further, in the output format notify message 10 according to the present preferred embodiment, parameters common to the two-dimensional video data and the three-dimensional video data are stored in the respective fields 23 to 31. Therefore, it is not required to transmit a different output format message to the sink device 120 for every type of the video data.

Second Preferred Embodiment

Figure 7:
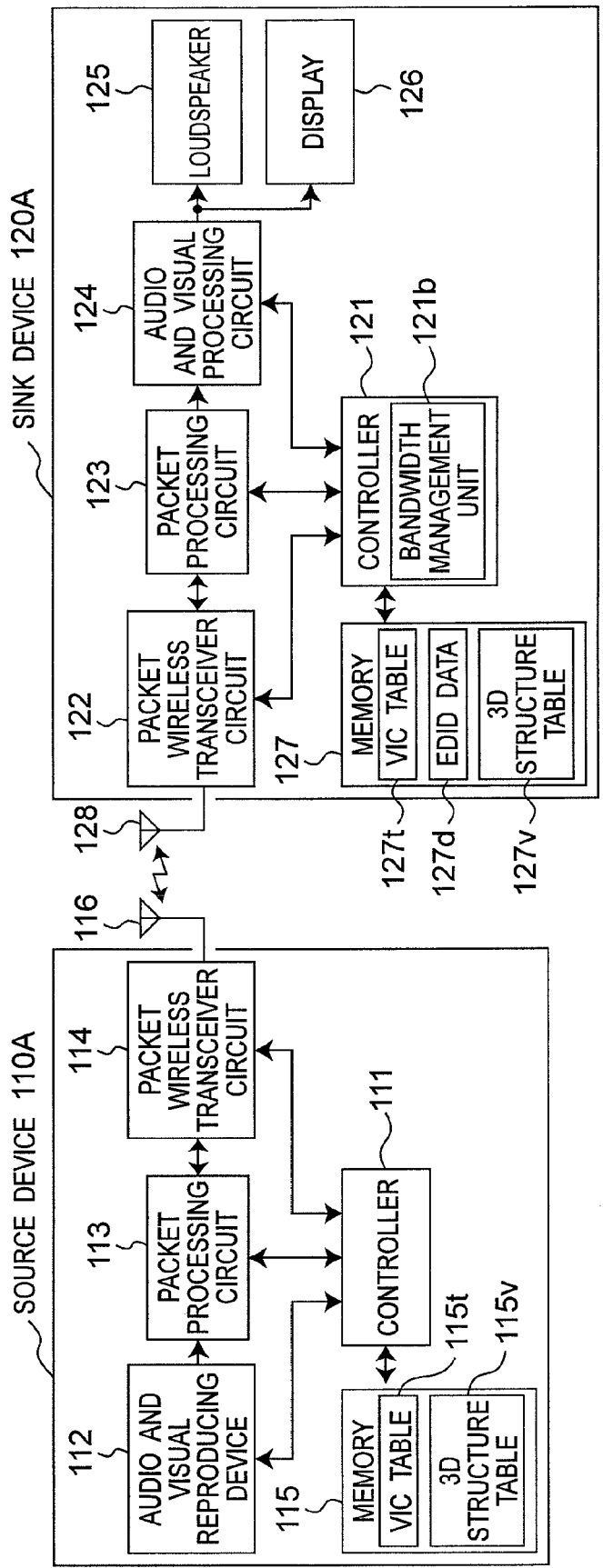
FIG. 7 is a block diagram showing a configuration of a wireless communication system for transmitting video data using a video data packet transmission method according to a second preferred embodiment of the present invention.
Figure 9:
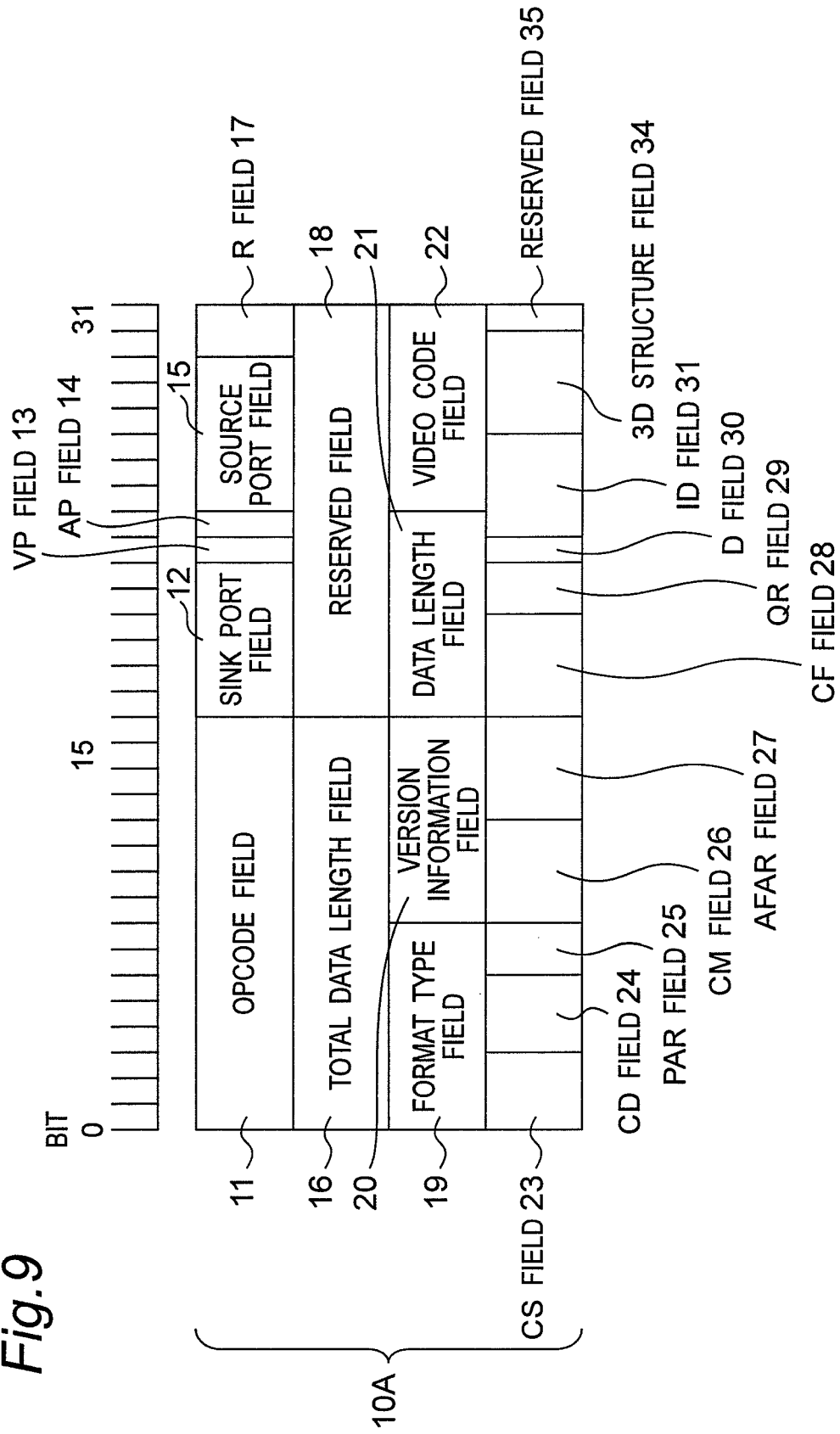
FIG. 9 is a diagram showing a format of an output format notify message 10A according to the second preferred embodiment of the present invention.

FIG. 7 is a block diagram showing a configuration of a wireless communication system for transmitting video data using a video data packet transmission method according to a second preferred embodiment of the present invention, and FIG. 8 is a table showing each of 3D structure tables 115v and 127v of FIG. 7. In addition, FIG. 9 is a diagram showing a format of an output format notify message 10A according to the second preferred embodiment of the present invention. The present preferred embodiment is different from the first preferred embodiment in the following respects.

(1) In a source device 110A, the memory 115 previously stores the VIC table 115t and the 3D structure table 115v.

(2) In a sink device 120A, the memory 127 previously stores the VIC table 127t and the 3D structure table 127v.

(3) The output format notify message 10A includes a 4-bit 3D structure field 34 and a 1-bit reserved field 35 instead of the 3D field 32 and the reserved field 33, as compared with the output format notify message 10.

Referring to FIG. 7, the source device 110A previously stores the VIC table 115t and the 3D structure table 115v in the memory 115. As shown in FIG. 8, each of the 3D structure tables 115v and 127v shows a relation ship among a 3D structure code stored in the 3D structure field 34 in the output format notify message 10A, a type of video data, and a format structure (also referred to as a video structure) of three-dimensional video data when the video data is the three-dimensional video data. As described later in detail, the format structure of the video data represents respective definitions of transmission order and transmission timings of respective video frame data such as left-eye video frame data, right-eye video frame data, left-eye top field video frame data, right-eye top field video frame data, left-eye bottom field video frame data, and right-eye bottom field video frame data, the respective video frame data being included in the three-dimensional video data. Namely, information on the format structure of the video data is provided to identify respective parameters for combining a plurality of video frame data included in one video data into at least one combined video frame data for every video frame data in the packet processing circuit 113.

Referring to FIG. 8, if the format structure is the frame packing (also referred to as the frame sequential), the combined video frame data is configured so that, in the horizontal display interval Th, N pieces of video frame data are sequentially transmitted for first to Nth (where N is an integer equal to or larger than 2) time intervals, respectively, having time interval lengths the same as each other within the vertical display interval Tv. In this case, for example, when the number N of the video frame data included in the three-dimensional video frame data is 2, first and second video frame data are left-eye video frame data L and right-eye video frame data R, respectively. In this case, the above-mentioned parameters are numbers of pixels of a horizontal active interval Hactive, a horizontal blanking interval Hblank, a vertical active interval Vactive and a vertical blanking interval Vblank, field rates (Hz), pixel frequencies (MHz), and a number Vspace, which has value equal to or larger than 0, of lines provided between video frame data R and L. In addition, the combined video frame data is configured so that, in the horizontal display interval Th, the left-eye video frame data L having a predetermined number Vvideo of lines is transmitted for a first half of the vertical display interval Tv, and the right-eye video frame data R having the predetermined number Vvideo of lines is transmitted for a second half of the vertical display interval Tv. When the number N of video frame data included in the three-dimensional video data is 4, first to fourth video frame data are left-eye top video frame data L_top (also referred to as left-eye odd-numbered video frame data L_odd), right-eye top video frame data R_top (also referred to as right-eye even-numbered video frame data R_odd), left-eye bottom video frame data L_bottom (also referred to as left-eye even-numbered video frame data L_even), and right-eye bottom video frame data R_bottom (also referred to as right-eye odd-numbered video frame data R_even), respectively.

In addition, if the format structure is the field alternative, the left-eye top video frame data L_top (also referred to as the left-eye odd-numbered video frame data L_odd) and the right-eye top video frame data R_top (also referred to as the right-eye odd-numbered video frame data L_odd) are combined into first combined video frame data in a time interval Tv1, and the left-eye bottom video data L_bottom (also referred to as the left-eye even-numbered video frame data) and the right-eye bottom video data R_bottom (also referred to as the right-eye even-numbered video frame data) are combined into second combined video frame data in the time interval Tv2. The time intervals Tv1 and Tv2 are provided between two consecutive vertical synchronizing intervals out of three consecutive vertical synchronizing intervals of the vertical synchronizing signal, respectively. In this case, the first combined video frame data is configured so that, in the horizontal display interval Th, the left-eye top video frame data L_top having a predetermined number of lines is transmitted for a first half of the vertical display interval Tv1, and thereafter, the right-eye top video frame top having the predetermined number of lines is transmitted for a second half of the vertical display interval Tv1. In addition, the second combined video frame data is configured so that, in the horizontal display interval Th, the left-eye bottom video frame data L_bottom having the predetermined number of lines is transmitted for a first half of the vertical display interval Tv2, and thereafter, the right-eye bottom video frame R_bottom having the predetermined number of lines is transmitted for a second half of the vertical display interval Tv2.

Further, if the format structure is line alternative, the combined video frame data is configured so that a plurality of horizontal line data L_H included in the left-eye video frame data L and a plurality of horizontal line data R_H included in the right-eye video frame data R are alternately transmitted for the vertical display interval in the horizontal display interval Th.

Still further, if the format structure is side by side (full), the combined video frame data is configured so that, in the vertical display interval Tv, the left-eye video frame data L having predetermined first pixels is transmitted for a first half of the horizontal display interval Th, and thereafter, the right-eye video frame data R having the predetermined first pixels is transmitted for a second half of the horizontal display interval Th. In addition, if the format structure is side by side (half), the combined video frame data is configured so that, in the vertical display interval Tv, the left-eye video frame data L having second pixels is transmitted for the first half of the horizontal display interval Th, and thereafter, the right-eye video frame data R having the predetermined second pixels is transmitted for a second half of the horizontal display interval Th. In this case, the number of the second pixels is half of the number of the first pixels.

In addition, if the format structure is L+Depth, the combined video frame data is configured so that two-dimensional video data L and depth data Depth are transmitted for the vertical display interval Tv. In addition, if the format structure is L+Depth+Graphics+(Graphics-Depth), the combined video frame data is configured so that two-dimensional video data L, the depth data Depth and graphics data Graphics, and a difference (Graphics-Depth) between the graphics data and the depth data are transmitted for the vertical display interval Tv.

Referring to FIG. 9, the output format notify message 10A according to the present preferred embodiment includes the 3D structure field 34 and the reserved field 35 instead of the 3 D field 32 and the reserved field 33, as compared with the output notify format message 10 according to the first preferred embodiment. In this case, the 3D structure field 34 stores the 3D structure code for identifying whether a type of video data to be transmitted is the two-dimensional video data or the three-dimensional video data, and for identifying which format structure is used from among a predetermined plurality of format structures to transmit three-dimensional video data when the video data to be transmitted is the three-dimensional video data.

Next, there will be described operations of the source device 110A and the sink device 120A when the source device 110A transmits AV data to the sink device 120A. First of all, before transmitting video data and audio data to the sink device 120A, the source device 110A refers to the 3D structure table 115v based on the type and the format structure of the video data to be transmitted so as to decide the 3D structure code to be stored in the 3D structure field 34. The source device 110A transmits the output format notify message 10A including the 3D structure field 34, which stores the decided 3D structure code, to the sink device 120A. Further, after transmitting the output format notify message 10A, the source device 110A transmits the AV data to the sink device 120A. The sink device 120A detects the 3D structure code stored in the 3D structure field 34 in the output format notify message 10A from the source device 110A, refers to the 3D structure table 127v based on the detected 3D structure code so as to identify the type and the format structure of the video data transmitted from the source device 110A. In addition, the sink device 120A decodes the received video data based on the identified type and format structure of the video data.

As described above, according to the present preferred embodiment, in the wireless transmission method compliant with the WirelessHD, the output format notify message 10A for the video data includes the 3D structure field 34, which stores the 3D structure code of the video data to be transmitted. Therefore, before transmitting the video data of the 3D content data to the sink device 120A, the source device 110A can notify the sink device 120A that the video data is the three-dimensional video data, and can notify the sink device 120A of the format structure of the video data using the 3D structure field 34 in the output format notify message 10A. In addition, the sink device 120A can decode the video data from the source device 110A based on the 3D structure code stored in the 3D structure field 34 in the received output format notify message 10A. Therefore, according to the present preferred embodiment, the source device 110A can transmit the three-dimensional video data to the sink device 120A in the format structure notified using the output format notify message 10A.

In addition, according to the present preferred embodiment, the source device 110A transmits the output format notify message 10A to the sink device 120A using one packet other than the packets for transmitting the video data before transmitting the video data. Accordingly, before receiving the video data, the sink device 120A can identify the type and the format structure of the video data. As compared with such a case where the video data and the data for identifying the type and format structure of the video data are transmitted using the same packet, the sink device 120A can smoothly reproduce the video data. Further, in the output format notify message 10A according to the present preferred embodiment, parameters common to the two-dimensional video data and the three-dimensional video data are stored in the respective fields 23 to 31. Therefore, it is not required to transmit a different output format message to the sink device 120A for every type of the video data.

Third Preferred Embodiment

Figure 10:
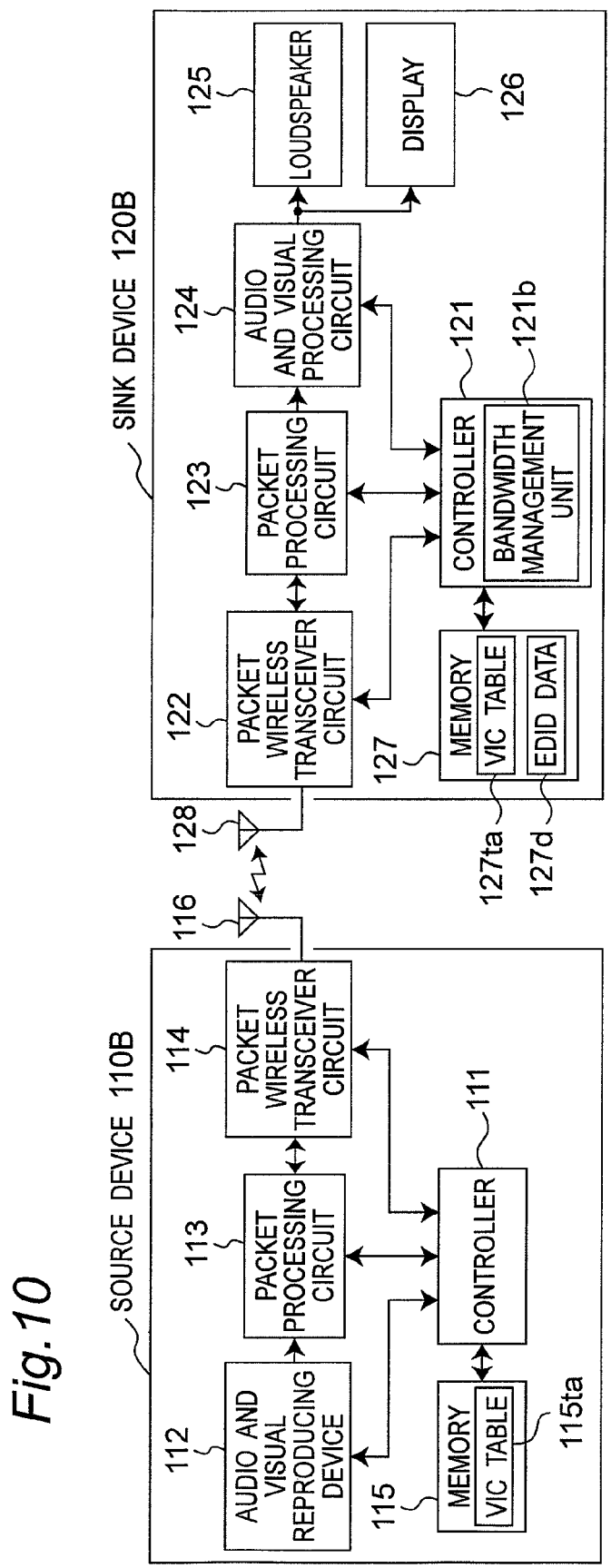
FIG. 10 is a block diagram showing a configuration of a wireless communication system for transmitting video data using a video data packet transmission method according to a third preferred embodiment of the present invention.
Figure 13:
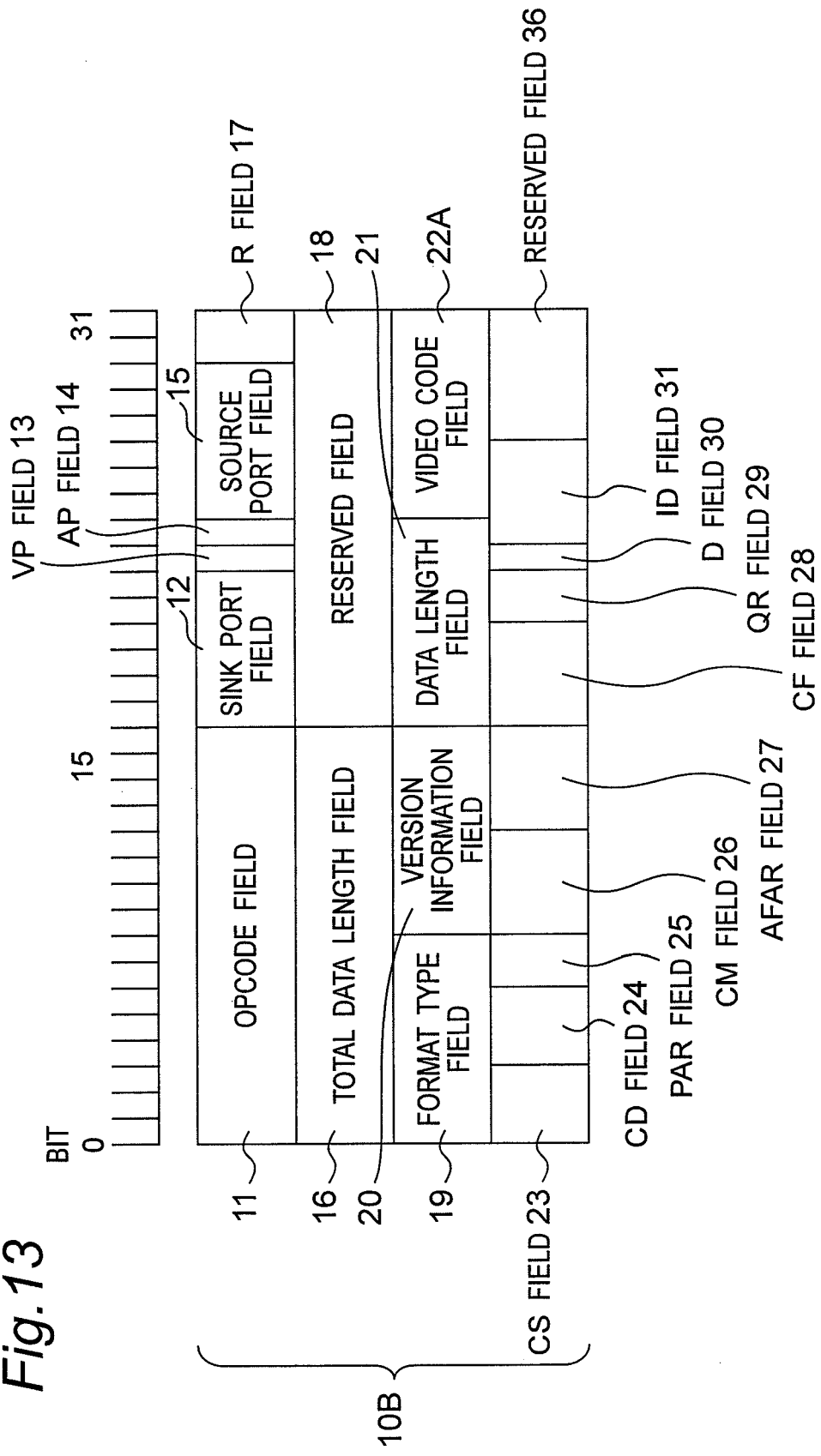
FIG. 13 is a diagram showing a format of an output format notify message 10B according to the third preferred embodiment of the present invention.

FIG. 10 is a block diagram showing a configuration of a wireless communication system for transmitting video data using a video data packet transmission method according to a third preferred embodiment of the present invention. In addition, FIGS. 11 and 12 show each of VIC tables 115ta and 127ta of FIG. 10, and FIG. 13 is a diagram showing a format of an output format notify message 10B according to the third preferred embodiment of the present invention. The present preferred embodiment is different from the first preferred embodiment in the following respects.

(1) In a source device 110B, the memory 115 previously stores the VIC table 115ta instead of the VIC table 115t.

(2) In a sink device 120B, the memory 127 previously stores the VIC table 127*ta* instead of the VIC table 127*t*.

(3) The output format notify message 10B includes an 8-bit video code field 22A, which stores a VIC for identifying a video format of the three-dimensional video data, instead of the video code field 22, which stores the VIC for identifying the video format of two-dimensional video data, and includes a 5-bit reserved field 36 instead of the 3D field 32 and the reserved field 33, as compared with the output format notify message 10.

As shown in FIGS. 2 and 3, in the first and second preferred embodiments, each of the VIC tables 115*t* and 127*t* is configured to show the relationship among each VIC, the number of vertical active pixels of video data, the number of horizontal active pixels of the video data, the scanning method of the video data, and the vertical synchronizing frequency of the video data. On the other hand, in the present preferred embodiment, as shown in FIGS. 11 and 12, each of the VIC tables 115*ta* and 127*ta* is configured to show a relationship among each VIC, the number of vertical active pixels of video data, the number of horizontal active pixels of the video data, the scanning method of the video data, the format structure of the three-dimensional video data when the video data is the three-dimensional video data, and the vertical synchronizing frequency of the video data. Namely, in the present preferred embodiment, each VIC identifies the type of the video data to be transmitted and the format structure of the three-dimensional video data when the type of video data is the three-dimensional video data. Referring to FIGS. 11 and 12, the VICs having values from 1 to 37, and the VICs having values from 128 to 136 are allocated to the video formats of 2D content data (content data including the two-dimensional video data), respectively, in a manner similar to that of the VIC tables of FIGS. 3 and 4. In addition, the VICs having values from 38 to 40 are allocated to the video formats of 3D content data, respectively, in the following manner.

(1) The VIC having the value 38 is allocated to a video format having the number of vertical horizontal pixels of 1920 pixels, the number of vertical active pixels of 1080 pixels, the scanning method of progressive scan, the field rate of 23.97 Hz, and format structure of the frame packing.

(2) The VIC having the value 39 is allocated to a video format having the number of vertical horizontal pixels of 1280 pixels, the number of vertical active pixels of 720 pixels, the scanning method of progressive scan, the field rate of 53.94 Hz, and format structure of the frame packing.

(3) The VIC having the value 40 is allocated to a video format having the number of vertical horizontal pixels of 1280 pixels, the number of vertical active pixels of 720 pixels, the scanning method of progressive scan, the field rate of 50 Hz, and format structure of the frame packing.

Referring to FIG. 13, the output format notify message 10B includes the 8-bit video code field 22A storing a VIC for identifying a video format of three-dimensional video data instead of the video code field 22 storing a VIC for identifying a video format of two-dimensional video data, and the 5-bit reserved field 36 instead of the 3D field 32 and the reserved field 33, as compared with the output format notify message 10 according to the first preferred embodiment.

Next, there will be described operations of the source device 110B and the sink device 120B when the source device 110B transmits AV data to the sink device 120B. First of all, before transmitting video data and audio data to the sink device 120B, the source device 110B refers to the 3D structure table 115*ta* based on the type of the video data to be transmitted, the number of vertical active pixels of the video data to be transmitted, the number of horizontal active pixels of the video data to be transmitted, the scanning method of the video data to be transmitted, the format structure of three-dimensional video data when the video data is the three-dimensional video data, and the vertical synchronizing frequency, so as to decide a VIC stored in the video code field 22A. Then, the source device 111B transmits the output format notify message 10B including the video code field 22A, which stores the decided value, to the sink device 120B. Further, after transmitting the output format notify message 10B, the source device 110B transmits the AV data to the sink device 120B. The sink device 120B detects the VIC stored in the video code field 22A of the output format notify message 10B from the source device 110B, refers to the VIC table 127*ta* based on the detected VIC so as to identify the type, the number of vertical active pixels, the number of horizontal active pixels, the scanning method, the format structure of three-dimensional video data when the video data is the three-dimensional video data, and the vertical synchronizing frequency of the video data transmitted from the source device 110B. In addition, the sink device 120B decodes the received video data and displays the decoded video data based on the identified type, number of vertical active pixels, number of horizontal active pixels, scanning method, format structure of three-dimensional video data when the video data is the three-dimensional video data, and vertical synchronizing frequency of the video data.

For example, when the source device 110B transmits the three-dimensional video data, the source device 110B selects one VIC from among the VICs having values 38 to 40, respectively, stores the selected VIC in the video code field 22A of the output format notify message 10B, and notifies the sink device 120B of the selected VIC. Further, after transmitting the output format notify message 10B, the source device 110B transmits 3D content data to the sink device 120B. By detecting that a data value in the video code field 22 in the output format notify message 10B is a value from 38 to 40, the sink device 120B identifies that the video data to be transmitted from the source device 110B is the three-dimensional video data, and identifies that the format structure of the three-dimensional video data is the frame packing.

As described above, according to the present preferred embodiment, in the wireless transmission method compliant with the WirelessHD, the output format notify message 10B for the video data includes the video code field 22A, which stores the VIC for identifying the type, the number of vertical active pixels, the number of horizontal active pixels, the scanning method, the format structure of three-dimensional video data when the video data is the three-dimensional video data, and the vertical synchronizing frequency of the video data to be transmitted. Therefore, before transmitting the video data of the 3D content data to the sink device 120B, the source device 110B can notify the sink device 120B that the video data is the three-dimensional video data, and can notify the sink device 120B of the format structure of the video data using the video code field 22A of the output format notify message 10B. In addition, the sink device 120B can decode the video data from the source device 110B based on the VIC stored in the video code field 22A of the received output format notify message 10B. Therefore, according to the present preferred embodiment, the source device 110B can transmit the three-dimensional video data to the sink device 120B in the format structure notified using the output format notify message 10B.

In addition, according to the present preferred embodiment, the source device 110B transmits the output format notify message 10B to the sink device 120B using one packet other than the packets for transmitting the video data before transmitting the video data. Accordingly, before receiving the video data, the sink device 120B can identify the type and the format structure of the video data. As compared with such a case where the video data and the data for identifying the type and format structure of the video data are transmitted using the same packet, the sink device 120B can smoothly reproduce the video data. Further, in the output format notify message 10B according to the present preferred embodiment, parameters common to the two-dimensional video data and the three-dimensional video data are stored in the respective fields 23 to 31. Therefore, it is not required to transmit a different output format message to the sink device 120B for every type of the video data.

Fourth Preferred Embodiment

Figure 14:
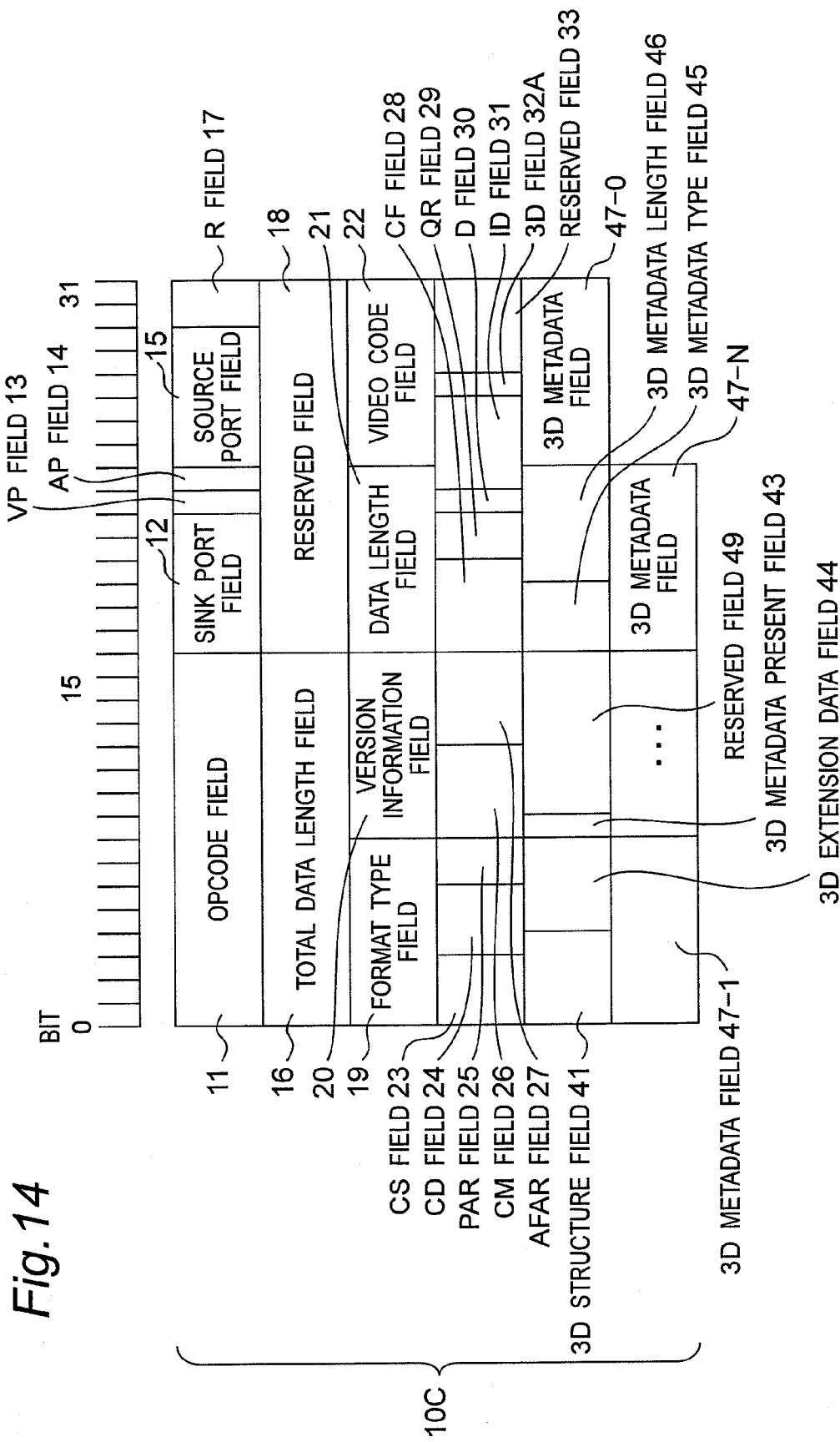
FIG. 14 is a diagram showing a format of an output format notify message 10C according to a fourth preferred embodiment of the present invention.

FIG. 14 is a diagram showing a format of an output format notify message 10C according to a fourth preferred embodiment of the present invention. The output format notify message 10C according to the present preferred embodiment is transmitted from the source device 110A according to the second preferred embodiment to the sink device 120A according to the second preferred embodiment. The output format notify message 10C according to the present preferred embodiment includes the following fields instead of the 3D structure field 34 and the reserved field 35, as compared with the output format notify message 10A according to the second preferred embodiment.

(1) A 1-bit 3D field 32A storing data for identifying whether or not 3D content data information is present, namely, whether a type of video data to be transmitted is the two-dimensional video data or the three-dimensional video data. The 3D field 32A stores 0 when the video data to be transmitted is the two-dimensional vide data, and stores 1 when the video data to be transmitted is the three-dimensional video data.

(2) A 4-bit 3D structure field 41 storing a 3D structure code (See FIG. 8) of the video data to be transmitted.

(3) A 1-bit 3D metadata present (3D_Metadata_present) field 43 storing 1 when 3D metadata fields 47-0, 47-1, . . . , and 47-N are present, and stores 0 when the 3D metadata fields 47-0, 47-1, . . . , and 47-N are not present.

(4) A 4-bit 3D extension data (3D_Ext_Data) field 44 storing data representing 3D extension data.

(5) A 3-bit 3D metadata type (3D_Metadata_type) field 45 storing data representing a type of the 3D metadata stored in the 3D metadata fields 47-0, 47-1, . . . , and 47-N.

(6) A 5-bit 3D metadata length (3D_Metadata_Length) field 46 storing a total data length of the 3D metadata fields 47-0, 47-1, . . . , and 47-N.

(7) The N+1 (where N is 0 or a positive integer) 3D metadata fields 47-0, 47-1, . . . , and 47-N (3D_Metadata_0, 3D_Metadata_1, 3D_Metadata_N) each having a size of 8 bits and each storing the 3D metadata.

(8) A reserved field 49.

Next, there will be described operations of the source device 110A and the sink device 120A when the source device 110A transmits AV data to the sink device 120A. First of all, before transmitting the AV data to the sink device 120A, the source device 110A refers to the 3D structure table 115*v* based on the type and the format structure of the video data to be transmitted, selects a 3D structure code, and stores the selected 3D structure code in the 3D structure field 41. In addition, the source device 110A stores 0 or 1 in the 3D field 32A based on the type of the video data to be transmitted. Further, the source device 110A stores predetermined data values in the 3D metadata present field 43, the 3D extension data field 44, the 3D metadata type field 45, the 3D metadata length field 46, and the 3D metadata fields 47-0, 47-1, . . . , and 47-D, respectively, based on the type and the format structure of the video data to be transmitted. In addition, after transmitting the output format notify message 10C to the sink device 120A, the source device 110A transmits the AV data to the sink device 120A. The sink device 120A detects the 3D structure code stored in the 3D structure field 41 in the output format notify message 10C from the source device 110A, refers to the 3D structure table 127*v* based on the detected 3D structure code so as to identify the type and the format structure of the video data transmitted from the source device 110A. In addition, the sink device 120A decodes the received video data based on the identified type and format structure of the video data.

For example, when the video data to be transmitted is the three-dimensional video data, the source device 110A sets 1 to the 3D field 32A, stores predetermined data in the 3D structure field 41, the 3D metadata present field 43, the 3D extension data field 44, the 3D metadata type field 45, the 3D metadata length field 46, and the 3D metadata fields 47-0, 47-1, . . . , and 47-N, respectively, based on the 3D metadata of format information on the 3D content data to be transmitted, and notifies the sink device 120 of the predetermined data. In this case, when 0 is set to the 3D metadata present field 43, the 3D metadata type field 45, the 3D metadata length field 46, and the 3D metadata fields 47-0, 47-1, . . . , and 47-N are not provided. When 1 is set to the 3D field 32A of the received output format notify message 10C, the sink device 120A detects that the video data transmitted from the source device 110A is the three-dimensional video data, and acquires the format information on the 3D content data based on the respective data stored in the output format notify message 10C. In addition, after transmitting the output format notify message 10C to the sink device 120A, the source device 110A transmits the 3D content data to the sink device 120A.

In addition, when the video data to be transmitted is the two-dimensional video data, the source device 110A sets 0 to the 3D field 32A, and notifies the sink device 120A of the type of the video data to be transmitted. In this case, when 0 is set to the 3D field 32A, the 3D structure field 41, the 3D metadata present field 43, the 3D extension data field 44, the 3D metadata type field 45, the 3D metadata length field 46, and the 3D metadata fields 47-0, 47-1, . . . , and 47-N are not provided. When 0 is set to the 3D field 32A, the sink device 120A detects that the video data transmitted from the source device 110A is the two-dimensional video data. In addition, after transmitting the output format notify message 10C to the sink device 120A, the source device 110A transmits 2D content data including the two-dimensional video data to the sink device 120A.

As described above, according to the present preferred embodiment, in the wireless transmission method compliant with the WirelessHD, the output format notify message 10C for the video data includes the 3D field 32A, the 3D structure field 41, the 3D metadata present field 43, the 3D extension data field 44, the 3D metadata type field 43, the 3D metadata length field 46, and the 3D metadata fields 47-0, 47-1, . . . , and 47-N. Therefore, before transmitting video data of the 3D content data to the sink device 120A, the source device 110A can notify the sink device 120A that the video data is the three-dimensional video data, and can notify the sink device 120A of the format structure of the video data and various format information on the 3D content data using the 3D field 32A, the 3D structure field 41, the 3D metadata present field 43, the 3D extension data field 44, the 3D metadata type field 43, the 3D metadata length field 46, and the 3D metadata fields 47-0, 47-1, . . . , and 47-N of the output format notify message 10C. In addition, the sink device 120A can decode the video data from the source device 110A based on the respective data stored in the 3D field 32A and the 3D structure field 41 in the received output format notify message 10C. Therefore, according to the present preferred embodiment, the source device 110A can transmit the three-dimensional video data to the sink device 120A in the format structure notified using the output format notify message 10C.

In addition, according to the present preferred embodiment, the source device 110A transmits the output format notify message 10C to the sink device 120A using one packet other than the packets for transmitting the video data before transmitting the video data. Accordingly, before receiving the video data, the sink device 120A can identify the type and the format structure of the video data. As compared with such a case where the video data and the data for identifying the type and format structure of the video data are transmitted using the same packet, the sink device 120A can smoothly reproduce the video data. Further, in the output format notify message 10C according to the present preferred embodiment, parameters common to the two-dimensional video data and the three-dimensional video data are stored in the respective fields 23 to 31. Therefore, it is not required to transmit a different output format message to the sink device 120A for every type of the video data.

Fifth Preferred Embodiment

Figure 15:
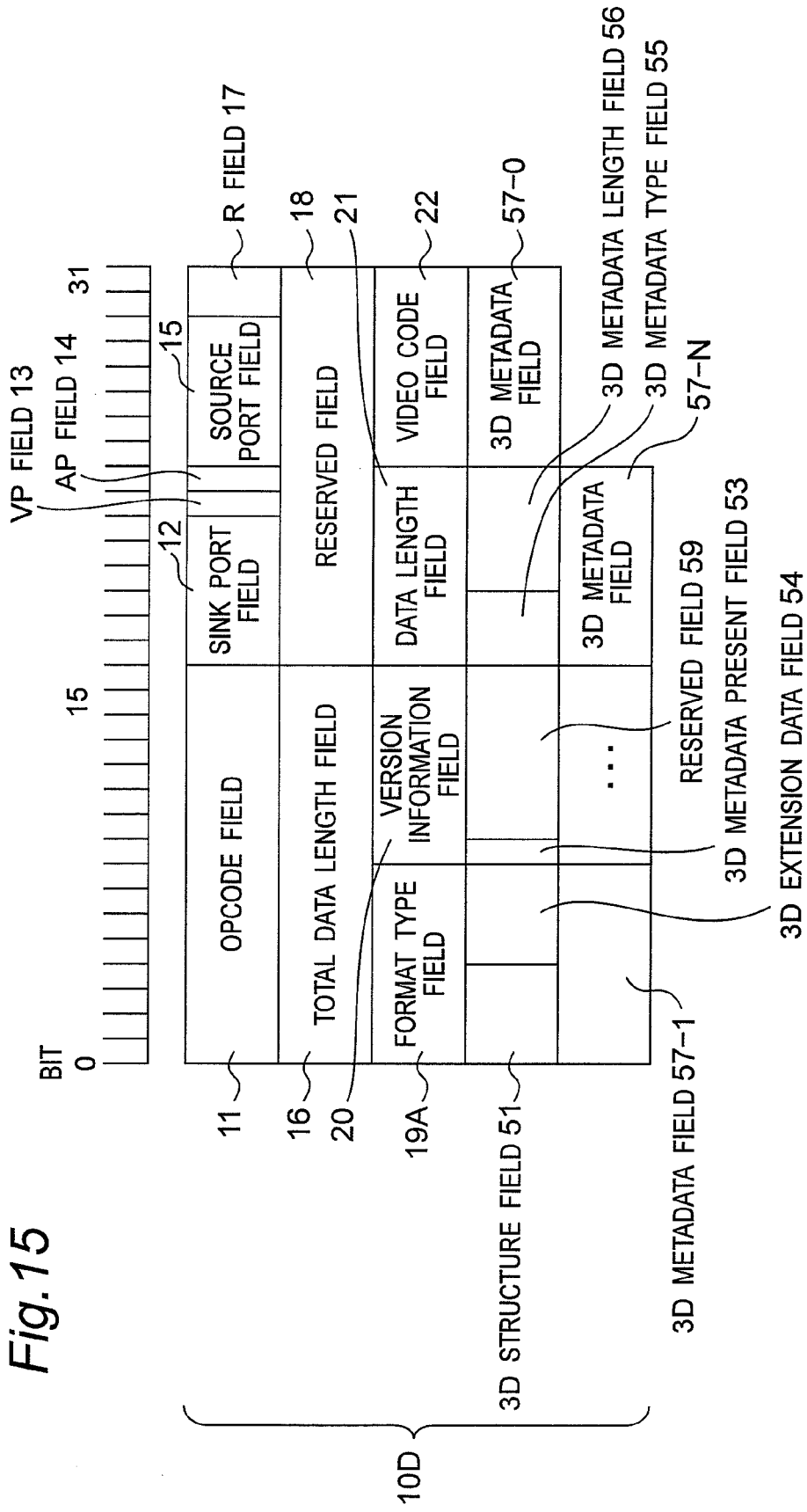
FIG. 15 is a diagram showing a format of an output format notify message 10D according to a fifth preferred embodiment of the present invention.

FIG. 15 is a diagram showing a format of an output format notify message 10D according to a fifth preferred embodiment of the present invention. The output format notify message 10D according to the present preferred embodiment is transmitted from the source device 110A according to the second preferred embodiment to the sink device 120A according to the second preferred embodiment. The output format notify message 10D according to the present preferred embodiment is different from the output format notify message 10A according to the second preferred embodiment in the following respects.

(1) The output format notify message 10D includes a format type field 19A storing data representing three-dimensional video format information instead of the format type field 19 storing data representing video format information.

(2) The output format notify message 10D includes the following fields instead of the fields 23 to 31, 34, and 35.

(a) A 4-bit 3D structure field 51 storing a 3D structure code of video data to be transmitted.

(b) A 1-bit 3D metadata present field 53 storing 1 when 3D metadata fields 57-0, 57-1, . . . , and 57-N are present, and storing 0 when the 3D metadata fields 57-0, 57-1, . . . , and 57-N are not present.

(c) A 4-bit 3D extension data field 54 storing data representing 3D extension data.

(d) A 3-bit 3D metadata type field 55 storing data representing a type of 3D metadata stored in the 3D metadata fields 57-0, 57-1, . . . , and 57-N.

(e) A 5-bit 3D metadata length field 56 storing a total data length of the 3D metadata fields 57-0, 57-1, . . . , and 57-N.

(f) The N+1 (where N is 0 or a positive integer) 3D metadata fields 57-0, 57-1, . . . , and 57-N each having a size of 8 bits and each storing the 3D metadata.

(8) A reserved field 59.

It is to be noted that the fields 51, 53, 54, 55, 56, 57-0, 57-1, . . . , and 57-N are configured in a manner similar to that of the above-mentioned fields 41, 43, 44, 45, 46, 47-0, 47-1, . . . , and 47-N, respectively.

As compared with the preceding preferred embodiments, the present preferred embodiment is characterized by newly defining the data representing the three-dimensional video format information as the data stored in the format type field 19A.

Next, there will be described operations of the source device 110A and the sink device 120A when the source device 110A transmits AV data to the sink device 120A. First of all, before transmitting the AV data to the sink device 120A, the source device 110A refers to the 3D structure table 115$v$ based on the type and the format structure of the video data to be transmitted, selects a 3D structure code, and stores the selected 3D structure code in the 3D structure field 51. In addition, the source device 110A stores 0 or 1 in the 3D field 32A based on the type of the video data to be transmitted. Further, the source device 110A stores predetermined data values in the 3D metadata present field 53, the 3D extension data field 54, the 3D metadata type field 55, the 3D metadata length field 56, and the 3D metadata fields 57-0, 57-1, . . . , and 57-N, respectively, based on the type and the format structure of the video data to be transmitted. In addition, after transmitting the output format notify message 10D to the sink device 120A, the source device 110A transmits the AV data to the sink device 120A. The sink device 120A detects the 3D structure code stored in the 3D structure field 51 in the output format notify message 10D from the source device 110A, refers to the 3D structure table 127$v$ based on the detected 3D structure code so as to identify the type and the format structure of the video data transmitted from the source device 110A. Then, the sink device 120A decodes the received video data based on the identified type and format structure of the video data.

For example, when the video data to be transmitted is the three-dimensional video data, the source device 110A sets a notify message data value of, for example, "0x07", about a 3D content data-dedicated output format to the format type field 19A. In addition, the source device 110A stores predetermined information in the 3D structure field 51, the 3D metadata present field 53, the 3D extension data field 54, the 3D metadata type field 55, the 3D metadata length field 56, and the 3D metadata fields 57-0, 57-1, . . . , and 57-N, respectively, based on 3D metadata of format information on 3D content data to be transmitted, and notifies the sink device 120A of the predetermined information. The sink device 120A acquires the format information on the 3D content data to be transmitted based on the output format notify message 10D from the source device 110A. In this case, when 0 is set to the 3D metadata present field 53, the 3D metadata type field 55, the 3D metadata length field 56, and the 3D metadata fields 57-0, 57-1, . . . , and 57-N are not provided. In addition, after transmitting the output format notify message 10C to the sink device 120A, the source device 110A transmits the 3D content data to the sink device 120A.

In addition, when the video data to be transmitted is the two-dimensional video data, the source device 110A transmits an output format notify message compliant with the WirelessHD according to the prior art (including a 5-bit reserved field instead of the 3D field 32 and the reserved field 33 in the output format notify message 10D) instead of the output format notify message 10D to the sink device 120A.

As described above, according to the present preferred embodiment, in the wireless transmission method compliant with the WirelessHD, the output format notify message 10D for the video data includes the 3D structure field 51, the 3D metadata present field 53, the 3D extension data field 54, the 3D metadata type field 55, the 3D metadata length field 56, and the 3D metadata fields 57-0, 57-1, . . . , and 57-N. Therefore, before transmitting video data of the 3D content data to the sink device 120A, the source device 110A can notify the sink device 120A that the video data is the three-dimensional video data, and can notify the sink device 120A of the format structure of the video data and various format information on the 3D content data using the 3D field 32A, the 3D structure field 51, the 3D metadata present field 53, the 3D extension data field 54, the 3D metadata type field 55, the 3D metadata length field 56, and the 3D metadata fields 57-0, 57-1, . . . , and 57-N of the output format notify message 10D. In addition, the sink device 120A can decode the video data from the source device 110A based on the respective data stored in the 3D field 32A and the 3D structure field 51 in the received output format notify message 10D. Therefore, according to the present preferred embodiment, the source device 110A can transmit three-dimensional video data to the sink device 120A in the format structure notified using the output format notify message 10D.

In addition, according to the present preferred embodiment, the source device 110A transmits the output format notify message 10D to the sink device 120A using one packet other than the packets for transmitting the video data before transmitting the video data. Accordingly, before receiving the video data, the sink device 120A can identify the type and the format structure of the video data. As compared with such a case where the video data and the data for identifying the type and format structure of the video data are transmitted using the same packet, the sink device 120A can smoothly reproduce the video data.

Sixth Preferred Embodiment

FIG. 16 is a diagram showing a format of an output format notify message 10E according to a sixth preferred embodiment of the present invention. The output format notify message 10E according to the present preferred embodiment is transmitted from the source device 110A according to the second preferred embodiment to the sink device 120A according to the second preferred embodiment. The output format notify message 10E according to the present preferred embodiment is characterized by including a 2-bit field frequency selection field 61 and a 2-bit reserved field 62 instead of the reserved field 33, as compared with the output format notify message 10C according to the fourth preferred embodiment.

Referring to FIG. 16, in such a case where two field rates are identified based on a VIC of video data to be transmitted, the field frequency selection field 61 stores 0 when the field rate of the video data is the lower field rate of the two field rates, stores 1 when the field rate of the video data is the higher field rate of the two field rates, and stores 2 when the field rate of the video data is both of the field rates.

Next, there will be described operations of the source device 110A and the sink device 120A when the source device 110A transmits AV data to the sink device 120A. First of all, before transmitting the AV data to the sink device 120A, the source device 110A refers to the 3D structure table 115v based on a type and a format structure of the video data to be transmitted, selects a 3D structure code, and stores the selected 3D structure code in the 3D structure field 44. In addition, the source device 110A stores 0 or 1 in the 3D field 32A based on the type of the video data to be transmitted. Further, the source device 110A stores predetermined data values in the 3D metadata present field 43, the 3D extension data field 44, the 3D metadata type field 45, the 3D metadata length field 46, and the 3D metadata fields 47-0, 47-1, . . . , and 47-N, respectively, based on the type and the format structure of the video data to be transmitted. Then, after transmitting the output format notify message 10E to the sink device 120A, the source device 110A transmits the AV data to the sink device 120A. The sink device 120A detects the 3D structure code stored in the 3D structure field 41 in the output format notify message 10E from the source device 110A, refers to the 3D structure table 127v based on the detected 3D structure code so as to identify the type and the format structure of the video data transmitted from the source device 110A. Then, the sink device 120A decodes the received video data based on the identified type and format structure of the video data.

For example, when the video data to be transmitted is the three-dimensional video data, the source device 110A sets 1 to the 3D field 32A, stores predetermined data in the 3D structure field 41, the 3D metadata present field 43, the 3D extension data field 44, the 3D metadata type field 45, the 3D metadata length field 46, and the 3D metadata fields 47-0, 47-1, . . . , and 47-N, respectively, based on the 3D metadata that is format information on 3D content data to be transmitted, and notifies the sink device 120 of the predetermined data. In this case, the field frequency selection field 61 stores data for selecting at least one of the two field rates when two field rates are identified based on the VIC stored in the video code field 22. For example, as shown in FIG. 2, when the VIC is 20, field rates of 23.97 Hz and 24 Hz are identified based on the VIC. However, the field rate 23.97 Hz can be selected by storing 1 in the field frequency selection field 61, the field rate 24 Hz can be selected by storing 2 in the field frequency selection field 61, and both the field rates 23.97 Hz and 24 Hz can be selected by storing 0 in the field frequency selection field 61. When 1 is set to the 3D field 32A of the received output format notify message 10E, the sink device 120A detects that the video data transmitted from the source device 110A is the three-dimensional video data, and acquires the format information on the 3D content data based on the respective data stored in the output format notify message 10E. In addition, the sink device 120A refers to the VIC table 127t based on the VIC stored in the video code field 22 and the value of the field frequency selection field 61, and selects and acquires the field rate. In addition, after transmitting the output format notify message 10E to the sink device 120A, the source device 110A transmits the 3D content data to the sink device 120A.

In addition, when the video data to be transmitted is the two-dimensional video data, the source device 110A sets 0 to the 3D field 32A so as to notify the sink device 120A that the video data to be transmitted is the two-dimensional video data. In this case, when 0 is stored in the 3D field 32A, the 3D structure field 41, the 3D metadata present field 43, the 3D extension data field 44, the 3D metadata type field 45, the 3D metadata length field 46, and the 3D metadata fields 47-0, 47-1, . . . , and 47-N are not provided. When 0 is stored in the 3D field 32A, the sink device 120A detects that the video data to be transmitted from the source device 110A is the two-dimensional video data. In addition, after transmitting the output format notify message 10E to the sink device 120A, the source device 110A transmits 2D content data including the two-dimensional video data to the sink device 120A. In this case, the value stored in the field frequency selection field 61 does not depend on whether the video data transmitted from the source device 110 is the two-dimensional video data or the three-dimensional video data.

As described above, according to the present preferred embodiment, in the wireless transmission method compliant with the WirelessHD, the output format notify message 10E for the video data includes the field frequency selection field 61. Therefore, as compared with the fourth preferred embodiment, the present preferred embodiment exhibits such an advantageous effect that at least one of the two field rates can be selected when the two field rates are identified based on the VIC stored in the video code field 22.

Seventh Preferred Embodiment

FIGS. 17 and 18 are tables showing VIC tables 115ta and 127ta according to a seventh preferred embodiment of the present invention. The present preferred embodiment is different from the third preferred embodiment only by how to allocate the VICs. In the present preferred embodiment, VICs having values from 96 to 99 are allocated to video formats of the three-dimensional video data, respectively. The present preferred embodiment exhibits an advantageous effect similar to that of the third preferred embodiment.

In each of the preferred embodiments, the source device 110, 110A or 110B is wirelessly connected to the sink device 120, 120A or 120B via a wireless transmission path compliant with the WirelessHD. However, the present invention is not limited to this, and the source device 110, 110A or 110B may be wirelessly connected to the sink device 120, 120A or 120B via a wireless transmission path compliant with a wireless communication standard other than the WirelessHD or a wired transmission cable. In this case, the source device 110, 110A or 110B transmits the output format notify message 10, 10A, 10B, 10C, 10D or 10E to the sink device 120, 120A or 120B, the output format notify message 10, 10A, 10B, 10C, 10D or 10E including data representing whether a type of video data to be transmitted is (a) three-dimensional video data including first video frame data and second video frame data or (b) two-dimensional video data including third video frame data, and including format information on three-dimensional video data when the video data to be transmitted is the three-dimensional video data. In addition, the sink device 120, 120A or 120B receives the output format notify message 10, 10A, 10B, 10C, 10D or 10E from the source device 110, 110A or 110B, identifies the type of the video data to be transmitted and the format information on the three-dimensional video data when the type of the video data to be transmitted is the three-dimensional video data based on the received output format notify message 10, 10A, 10B, 10C, 10D or 10E, receives the video data from the source device 110, 110A or 110B, and decodes the video data based on the identified type and format information.

In each of the preferred embodiments, the values allocated to the respective 3D structure codes may be values other than those shown in FIG. 8, and the format structures of the three-dimensional video data are not limited to those shown in FIG. 8. In addition, in the VIC tables 115ta and 127ta, the values allocated to the respective formats of the three-dimensional video data are not limited to the values allocated in the third and seventh preferred embodiments. Further, in the third and seventh preferred embodiments, the VICs are allocated to the three types of 3D content video formats, respectively. However, the number of types of video formats is not limited to three but 3D content video formats each having the numbers of active pixels, field rates, and structures different from those of the three video formats may be used.

In addition, in each of the preferred embodiments, the bandwidth management unit 121b is provided in the sink device 120, 120A or 120B. However, the present invention is not limited to this, and the bandwidth management unit 121b may be provided in the source device 110, 110A or 110B or another device.

INDUSTRIAL APPLICABILITY

As described above in detail, according to the method of transmitting video data, the source device transmitting the video data, the sink device receiving the video data, and the communication system including the source device and the sink device according to the present invention, the source device transmits the output format notify message to the sink device before transmitting the video data to the sink device, the output format notify message including data representing whether the type of the video data to be transmitted is (a) three-dimensional video data including first video frame data and second video frame data or (b) two-dimensional video data including third video frame data, and including the format information on three-dimensional video data when the video data to be transmitted is the three-dimensional video data. In addition, the sink device receives the output format notify message from the source device, identifies the type of the video data to be transmitted and the format information on the three-dimensional video data when the type of the video data to be transmitted is the three-dimensional video data based on the received output format notify message, receives the video data from the source device, and decodes the video data based on the identified type and format information. Therefore, it is possible to transmit the three-dimensional video data.

In particular, the present invention can be used to transmission of uncompressed AV content data in a wireless communication system compliant with a wireless communication standard such as the WirelessHD.

REFERENCE SINGS LIST

1 . . . device capability request message,
2 . . . device capability response message,
6 . . . connection request message,
7 . . . connection response message,
8 . . . stream start notify message,
10, 10A, 10B, 10C, 10D and 10E . . . output format notify message,
11 . . . opcode field,
12 . . . sink port field,
13 . . . VP field,
14 . . . AP field,
15 . . . source port field,
16 . . . total data length field,
17 . . . R field,
18 . . . reserved field,
19 and 19A . . . format type field,
20 . . . version information field,
21 . . . data length field,
22 and 22A . . . video code field,
23 . . . CS field,
24 . . . CD field,
25 . . . PAR field,
26 . . . CM field,
27 . . . AFAR field,
28 . . . CF field,
29 . . . QR field,
30 . . . D field,
31 . . . ID field,
32 and 32A . . . 3D field,
33 . . . reserved field, 34 ... 3D structure field,
35 ... reserved field,
36 ... reserved field,
41 ... 3D structure field,
43 ... 3D metadata present field,
44 ... 3D extension data field,
45 ... 3D metadata type field,
46 ... 3D metadata length field,
47-0, 47-1, ..., and 47-N ... 3D metadata length field,
49 ... reserved,
51 ... 3D structure field,
53 ... 3D metadata present field,
54 ... 3D extension data field,
55 ... 3D metadata type field,
56 ... 3D metadata length field,
57-0, 57-1, ..., and 57-N ... 3D metadata length field,
59 ... reserved field,
61 ... field frequency selection field,
62 ... reserved field,
110, 110A and 110B ... source device,
111 ... controller,
112 ... audio and visual reproducing device,
113 ... packet processing circuit,
114 ... packet wireless transceiver circuit,
115 ... memory,
115$t$ and 115$ta$ ... VIC table,
115$v$ ... 3D structure table,
116 ... antenna,
120, 120A and 120B ... sink device,
121 ... controller,
122 ... packet wireless transceiver circuit,
123 ... packet processing circuit,
124 ... audio and visual processing circuit,
125 ... loudspeaker,
126 ... display,
127 ... memory,
127$d$ ... EDID data,
127$t$ and 127$ta$ ... VIC table,
127$v$ ... 3D structure table,
181 ... left-eye video frame data,
182 ... right-eye video frame data,
183 ... combined video frame data.

The invention claimed is:

1. A source device for a communication system for transmitting video data including (a) three-dimensional video data including first video frame data and second video frame data and (b) two-dimensional video data including third video frame data from the source device to a sink device, the source device comprising:
   a first storage device for storing a first video format identification code table indicating a relationship among a video format information identifier, a type of video data, output specifications of the video data, and a format structure of the three-dimensional video data when the type of the video data is the three-dimensional video data,
   a first controller for, before transmitting video data to be transmitted, determining the video format information identifier of the video data to be transmitted by referring to the first video format identification code table based on the type of the video data to be transmitted, the output specifications of the video data to be transmitted, and the format structure of the three-dimensional video data when the type of the video data to be transmitted is the three-dimensional video data, for storing a determined video format information identifier into a video code field included in an output format notify message, and for transmitting the output format notify message to the sink device; and
   a transmitter for combining the first video frame data and the second video frame data into combined video frame data for every video frame when the video data to be transmitted is the three-dimensional video data, and for transmitting the combined video frame data to the sink device, the combined video frame data having the format structure included in the output format notify message.

2. The source device as claimed in claim 1, wherein the output specifications of the video data include a number of vertical active pixels of the video data to be transmitted, a number of horizontal active pixels of the video data to be transmitted, and a vertical synchronizing frequency of the video data to be transmitted.

3. The source device as claimed in claim 1, wherein the output format notify message includes a parameter common to the two-dimensional video data and the three-dimensional video data.

4. A sink device for a communication system for transmitting video data including (a) three-dimensional video data including first video frame data and second video frame data and (b) two-dimensional video data including third video frame data from a source device to the sink device, the sink device comprising:
   a storage device for storing a video format identification code table indicating a relationship among a video format information identifier, a type of video data, output specifications of the video data, and a format structure of the three-dimensional video data when the type of the video data is the three-dimensional video data;
   a controller for receiving, from the source device, an output format notify message including a video code field storing the video format information identifier of video data to be transmitted, and for identifying the type of the video data to be transmitted, the output specifications of the video data to be transmitted, and the format structure of the three-dimensional video data when the type of the video data to be transmitted is the three-dimensional video data by referring to the video format identification code table based on the video format information identifier included in the received output format notify message; and
   a receiver for receiving the video data from the source device, and decoding the received video data based on the identified type of the video data to be transmitted, the identified output specification of the video data to be transmitted and the identified format structure of the three-dimensional video data.

5. A communication system comprising a source device and a sink device, the communication system being for transmitting video data including (a) three-dimensional video data including first video frame data and second video frame data and (b) two-dimensional video data including third video frame data from the source device to the sink device,
   wherein the source device comprises:
   a first storage device for storing a first video format identification code table indicating a relationship among a video format information identifier, a type of video data, output specifications of the video data, and a format structure of the three-dimensional video data when the type of the video data is the three-dimensional video data;
   a first controller for, before transmitting video data to be transmitted, determining the video format information identifier of the video data to be transmitted by referring to the first video format identification code table based on the type of the video data to be transmitted, the output specifications of the video data to be transmitted, and the format structure of the three-dimensional video data when the type of the video data to be transmitted is the three-dimensional video data, for storing a determined video format information identifier into a video code field included in an output format notify message, and for transmitting the output format notify message to the sink device; and a transmitter for combining the first video frame data and the second video frame data into combined video frame data for every video frame when the video data to be transmitted is the three-dimensional video data, and for transmitting the combined video frame data to the sink device, the combined video frame data having the format structure included in the output format notify message, and wherein the sink device comprises:

a second storage device for storing a second video format identification code table indicating the relationship among the video format information identifier, the type of the video data, the output specifications of the video data, and the format structure of the three-dimensional video data when the type of the video data is the three-dimensional video data;

a second controller for receiving the output format notify message from the source device, and for identifying the type of the video data to be transmitted, the output specifications of the video data to be transmitted, and the format structure of the three-dimensional video data when the type of the video data to be transmitted is the three-dimensional video data by referring to the second video format identification code table based on the video format information identifier included in the received output format notify message; and a receiver for receiving the video data from the source device, and decoding the received video data based on the identified type of the video data to be transmitted, the identified output specification of the video data to be transmitted and the identified format structure of the three-dimensional video data.

6. A method for transmitting video data including (a) three-dimensional video data including first video frame data and second video frame data and (b) two-dimensional video data including third video frame data from a source device to a sink device, the method including steps of:

at the source device, storing a first video format identification code table indicating a relationship among a video format information identifier, a type of video data, output specifications of the video data, and a format structure of the three-dimensional video data when the type of the video data is the three-dimensional video data;

at the source device, before transmitting video data to be transmitted, determining the video format information identifier of the video data to be transmitted by referring to the first video format identification code table based on the type of the video data to be transmitted, the output specifications of the video data to be transmitted, and the format structure of the three-dimensional video data when the type of the video data to be transmitted is the three-dimensional video data, storing a determined video format information identifier into a video code field included in an output format notify message, and transmitting the output format notify message to the sink device;

at the source device, combining the first video frame data and the second video frame data into combined video frame data for every video frame when the video data to be transmitted is the three-dimensional video data, and transmitting the combined video frame data to the sink device, the combined video frame data having the format structure included in the output format notify message;

at the sink device, storing a second video format identification code table indicating the relationship among the video format information identifier, the type of video data, output specifications of the video data, and the format structure of the three-dimensional video data when the type of the video data is the three-dimensional video data;

at the sink device, receiving the output format notify message from the source device, and identifying the type of the video data to be transmitted, the output specifications of the video data to be transmitted, and the format structure of the three-dimensional video data when the type of the video data to be transmitted is the three-dimensional video data by referring to the second video format identification code table based on the video format information identifier included in the received output format notify message; and at the sink device, receiving the video data from the source device, and decoding the received video data based on the identified type of the video data to be transmitted, the identified output specification of the video data to be transmitted and the identified format structure of the three-dimensional video data.

* * * * *